(12) United States Patent
Chung et al.

(10) Patent No.: US 10,860,134 B2
(45) Date of Patent: Dec. 8, 2020

(54) DISPLAY DEVICE

(71) Applicant: LG Display Co., Ltd., Seoul (KR)

(72) Inventors: Moonsoo Chung, Paju-si (KR); Joohee Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/655,824

(22) Filed: Oct. 17, 2019

(65) Prior Publication Data
US 2020/0159385 A1     May 21, 2020

(30) Foreign Application Priority Data
Nov. 16, 2018 (KR) .......................... 10-2018-0141683

(51) Int. Cl.
*G06F 3/042* (2006.01)
*G06F 3/041* (2006.01)
*G09G 3/20* (2006.01)

(52) U.S. Cl.
CPC .......... *G06F 3/04166* (2019.05); *G06F 3/042* (2013.01); *G06F 3/0412* (2013.01); *G09G 3/20* (2013.01); *G09G 2310/08* (2013.01)

(58) Field of Classification Search
CPC ...... G06F 3/041; G06F 3/0412; G06F 3/0416; G06F 3/042; G09G 3/20; G09G 2310/08
See application file for complete search history.

(56) References Cited

U.S. PATENT DOCUMENTS

| | | | |
|---|---|---|---|
| 6,747,638 B2* | 6/2004 | Yamazaki | H01L 27/14678 345/207 |
| 7,158,129 B2* | 1/2007 | Nakajima | G06F 3/03545 345/175 |
| 7,800,594 B2* | 9/2010 | Nakamura | G06F 3/0412 345/175 |
| 2008/0246708 A1* | 10/2008 | Ishiguro | G02F 1/13318 345/87 |
| 2009/0309858 A1* | 12/2009 | Jin | G06F 3/0412 345/207 |
| 2010/0225617 A1* | 9/2010 | Yoshimoto | G06F 3/042 345/175 |

(Continued)

FOREIGN PATENT DOCUMENTS

KR   10-2011-0068652 A    6/2011
KR   20110068652 A  *  6/2011

*Primary Examiner* — Joe H Cheng
(74) *Attorney, Agent, or Firm* — Fenwick & West LLP

(57) ABSTRACT

The display device of the present disclosure may comprise a display panel equipped with pixels each representing image data and photo sensors each outputting an electric signal through a sensing line responding to light, a data driving circuit providing a data voltage corresponding to the image data to the pixel through a data line, a gate driving circuit supplying, through a gate line, a scan signal for controlling an application of the data voltage to the pixel disposed on a horizontal line and for controlling a connection of the photo sensor disposed on a corresponding horizontal line and the sensing line, a sensing driving circuit outputting digital sensing data by summing the electric signals of two photo sensors disposed on different horizontal lines and sharing the sensing line; and a timing controller supplying control signals for controlling the data driving circuit, the gate driving circuit and the sensing driving circuit.

22 Claims, 18 Drawing Sheets

(56) References Cited

U.S. PATENT DOCUMENTS

| | | | | |
|---|---|---|---|---|
| 2010/0283765 A1* | 11/2010 | Gotoh | ............... | G06F 3/042 |
| | | | | 345/175 |
| 2011/0205209 A1* | 8/2011 | Kurokawa | ......... | G06F 3/04164 |
| | | | | 345/211 |
| 2011/0221945 A1* | 9/2011 | Kurokawa | ........... | G06F 3/0412 |
| | | | | 348/300 |
| 2012/0287085 A1* | 11/2012 | Yuki | ................ | G09G 3/3648 |
| | | | | 345/175 |
| 2015/0324981 A1* | 11/2015 | Kim | ................ | G06T 7/0014 |
| | | | | 345/619 |
| 2015/0331508 A1* | 11/2015 | Nho | .............. | G06F 3/042 |
| | | | | 345/173 |
| 2018/0005588 A1* | 1/2018 | Kurokawa | ............. | B60K 37/02 |
| 2018/0053459 A1* | 2/2018 | Fukai | ................ | G09G 3/3688 |
| 2018/0107069 A1* | 4/2018 | Lee | ................ | G02F 1/133617 |
| 2018/0285619 A1* | 10/2018 | Kim | ................ | G06K 9/00013 |
| 2019/0163313 A1* | 5/2019 | Kim | ................ | G06F 3/0416 |
| 2019/0220121 A1* | 7/2019 | Kim | ................ | H01L 27/323 |
| 2020/0051499 A1* | 2/2020 | Chung | ............... | G09G 3/3233 |
| 2020/0064967 A1* | 2/2020 | Shin | ................ | G06F 3/0416 |

* cited by examiner

DISPLAY DEVICE

CROSS-REFERENCE TO RELATED APPLICATIONS

This application claims the benefit of Republic of Korea Patent Application No. 10-2018-0141683 filed on Nov. 16, 2018, which is incorporated by reference in its entirety.

BACKGROUND

Field of the Disclosure

The present disclosure relates to a display device, and more particularly, to a display device which raises the level of the output signal of the photo sensor disposed in a display panel.

Discussion of the Related Art

Recently, there has been an attempt to incorporate a photo sensor into a display panel and use it as an input device such as a touch input or a fingerprint sensor. The photo sensor is a device that stores the charge amount corresponding to a light intensity as information and outputs the stored information according to the control signal.

In order to use a signal output from the photo sensor as an input signal, the photo sensors must be uniformly arranged on the display panel, a driving signal for driving the photo sensor must be applied, and a sensing line for connecting the photo sensor to a detection circuit must be provided.

In a general display device incorporating the photo sensor, the photo sensor is connected to a gate line, a scan signal supplied to a gate line is used as a driving signal of the photo sensor, and the output of the photo sensor is taken out to the detection circuit through a separate sensing line running in parallel with the data line.

In response to the scan signal, the charges stored in the photo sensor are transferred to the detection circuit through the sensing line. A data voltage is also applied to a pixel through the data line in accordance with the scan signal so that the voltage fluctuation of the data line may be introduced into the sensing line. Accordingly, even when no light is incident on the photo sensor and no charge is stored in the photo sensor, the detection circuit connected to the photo sensor may detect a sensing signal.

Such a problem occurs, because, when charges are stored in the photo sensor on which light is incident and a sensing signal is generated in the detection circuit due to the charges, the level of the sensing signal is small, so it is difficult to distinguish it from the noise coming on the sensing line

SUMMARY

The present disclosure has been made in view of the above circumstances. It is an object of the present disclosure to raise the level of the output signal of the photo sensor. By raising the output signal level of the photo sensor, the input device using the photo sensor is robust against external noise and the photo input sensitivity is increased.

The display device according to an embodiment of the present disclosure may comprise a display panel including a plurality of pixels and a plurality of photo sensors, the plurality of pixels representing image data and the plurality of photo sensors each outputting an electric signal through a sensing line responsive to light incident on the photo sensor; a data driving circuit configured to provide data voltages corresponding to the image data to the plurality of pixels through a plurality of data lines; a gate driving circuit configured to supply, through a first gate line connected to a pixel from the plurality of pixels, a first scan signal that controls an application of a data voltage to the pixel that is disposed on a first horizontal line and controls a connection of a photo sensor from the plurality of photo sensors to the sensing line, the photo sensor disposed on the first horizontal line; a sensing driving circuit configured to output digital sensing data by summing electric signals of at least two photo sensors from the plurality of photo sensors, the two photo sensors including the first photo sensor and a second photo sensor that is disposed on a second horizontal line that is different from the first horizontal line, the first photo sensor and the second photo sensor sharing the sensing line; and a timing controller configured to provide the image data to the data driving circuit and to supply control signals for controlling the data driving circuit, the gate driving circuit and the sensing driving circuit.

In one embodiment, a display device comprises: a display panel including a plurality of pixels including a first pixel and a second pixel, and a plurality of photo sensors including a first photo sensor and a second photo sensor that each output an electric signal responsive to incident light, wherein the first pixel and the first photo sensor are disposed in a first horizontal line of the display panel and the second pixel and the second photo sensor are disposed in a second horizontal line of the display panel that is different from the first horizontal line; a data driving circuit configured to provide data voltages to the plurality of pixels through a plurality of data lines connected to the plurality of pixels; a gate driving circuit configured to supply a plurality of scan signals to the plurality of pixels and the plurality of photo sensors, the plurality of scan signals including a first scan signal and a second scan signal, wherein the first scan signal is supplied to the first pixel and the first photo sensor through a first gate line to apply a data voltage to the first pixel via a data line connected to the first pixel and to connect the first photo sensor to a sensing line, and the second scan signal is supplied to the second pixel and the second photo sensor through a second gate line to connect the second photo sensor to the sensing line without applying a data voltage to the second pixel, the second scan signal supplied to the second gate line while the first scan signal is supplied to the first gate line; and a sensing driving circuit to output digital sensing data based on the electric signals output by the first photo sensor and the second photo sensor via the sensing line responsive to the incident light.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

Figure 4:
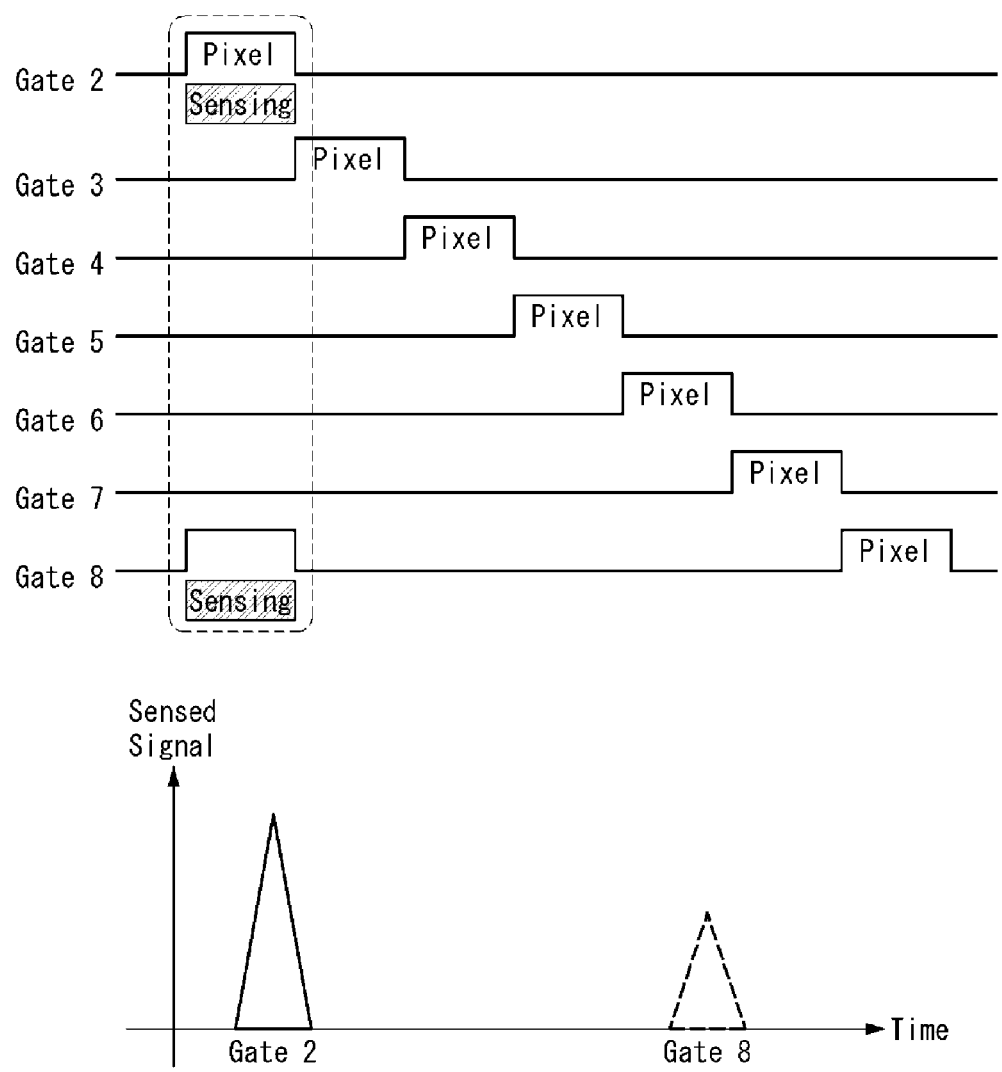

FIG. 4 conceptually illustrates one embodiment of the present disclosure which simultaneously applies scan signals to two photo sensors and outputs signals by summing the outputs of the two photo sensors.

Figure 5:
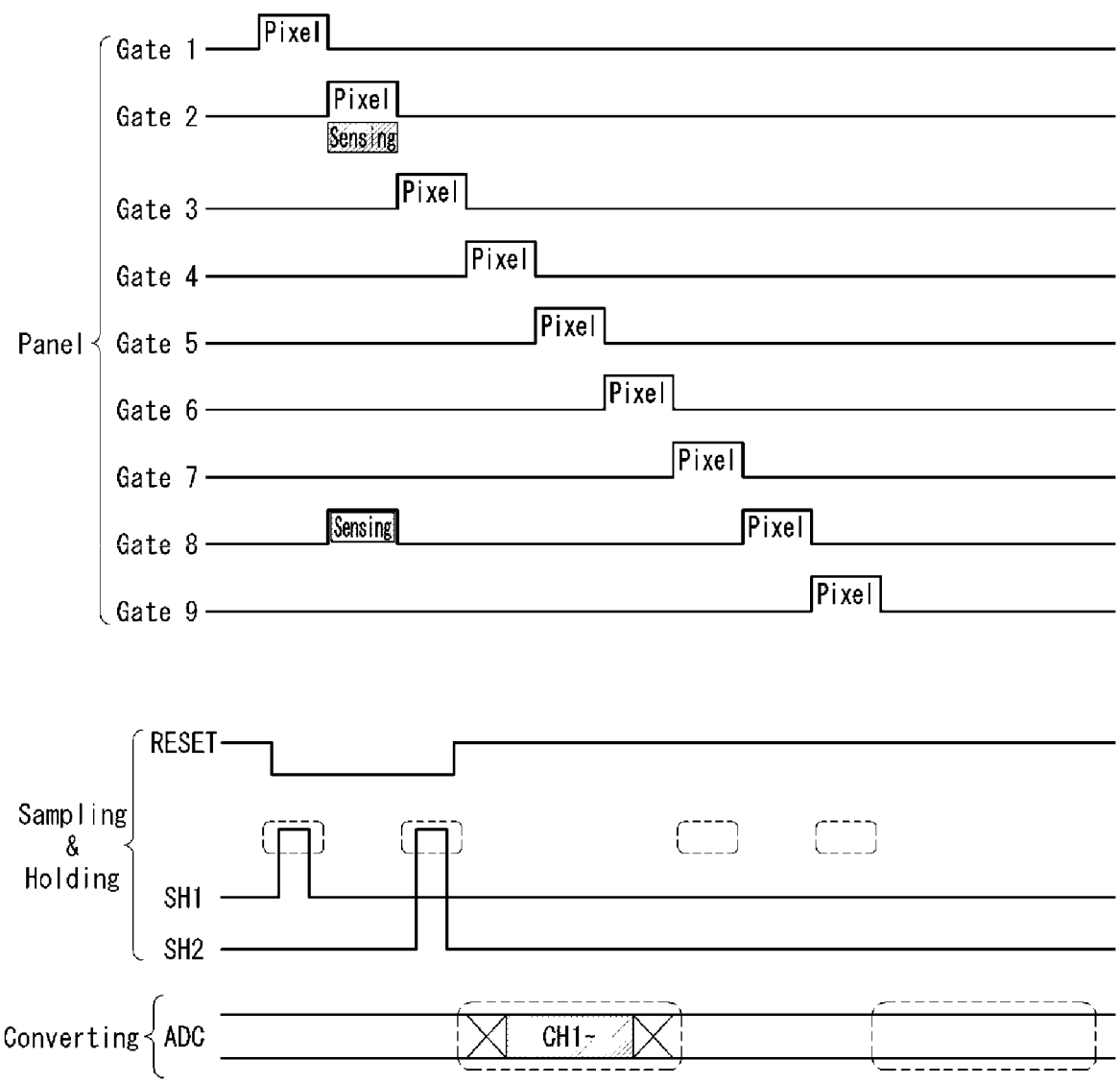
Figure 6:
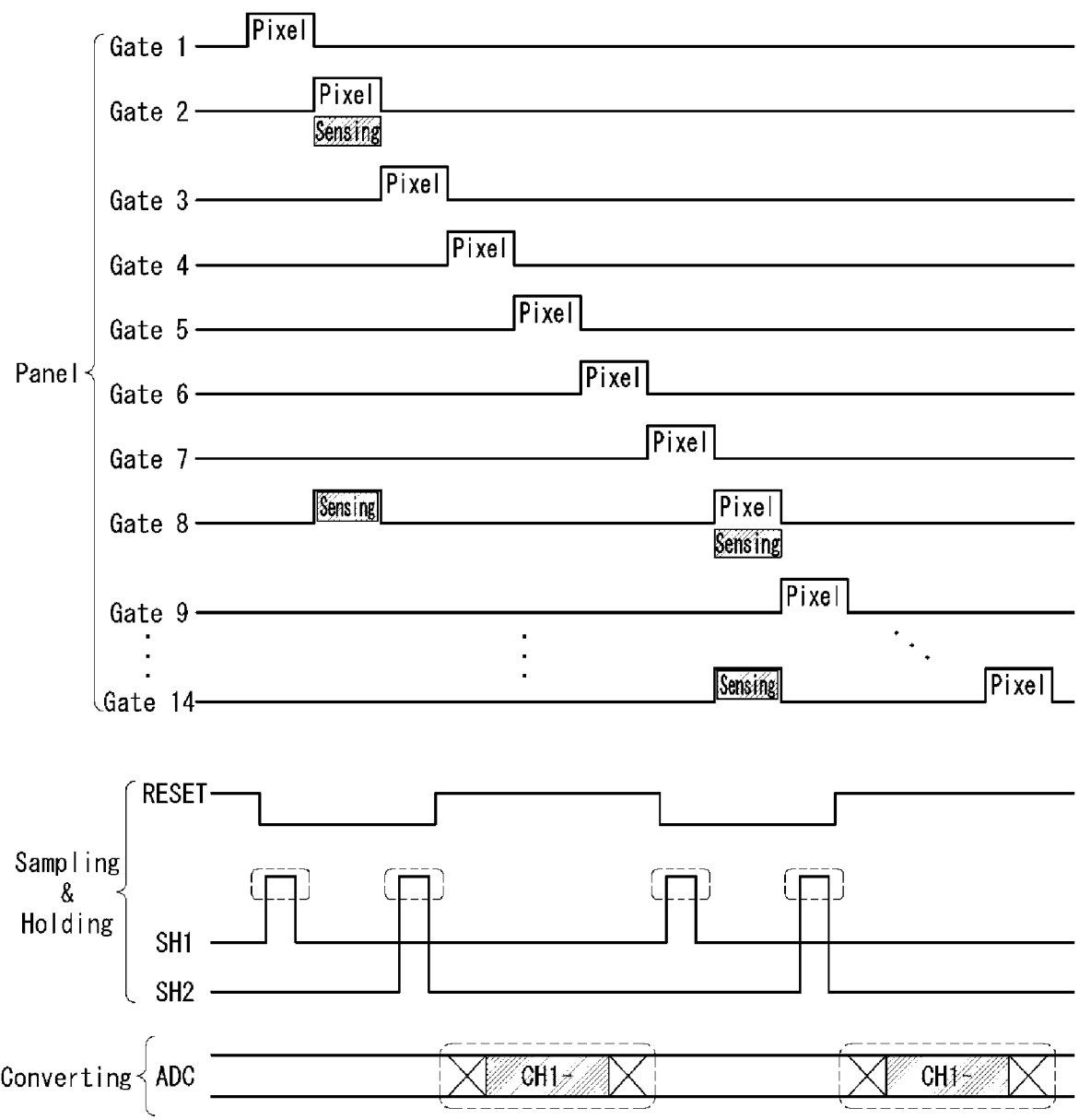

FIGS. 5 and 6 are respectively timing charts of control signals for the embodiment of FIG. 4.

Figure 7:
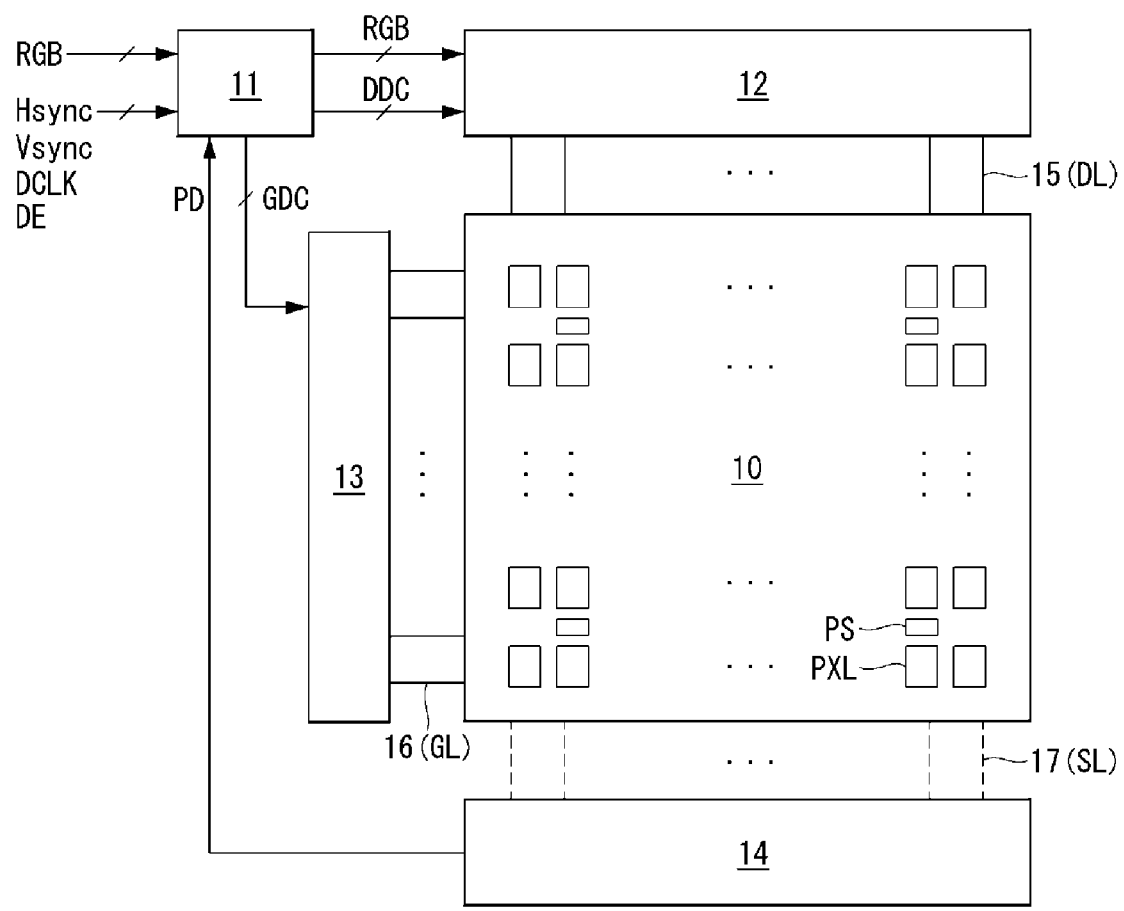

FIG. 7 is a block diagram of a display device according to according to one embodiment.

Figure 8:
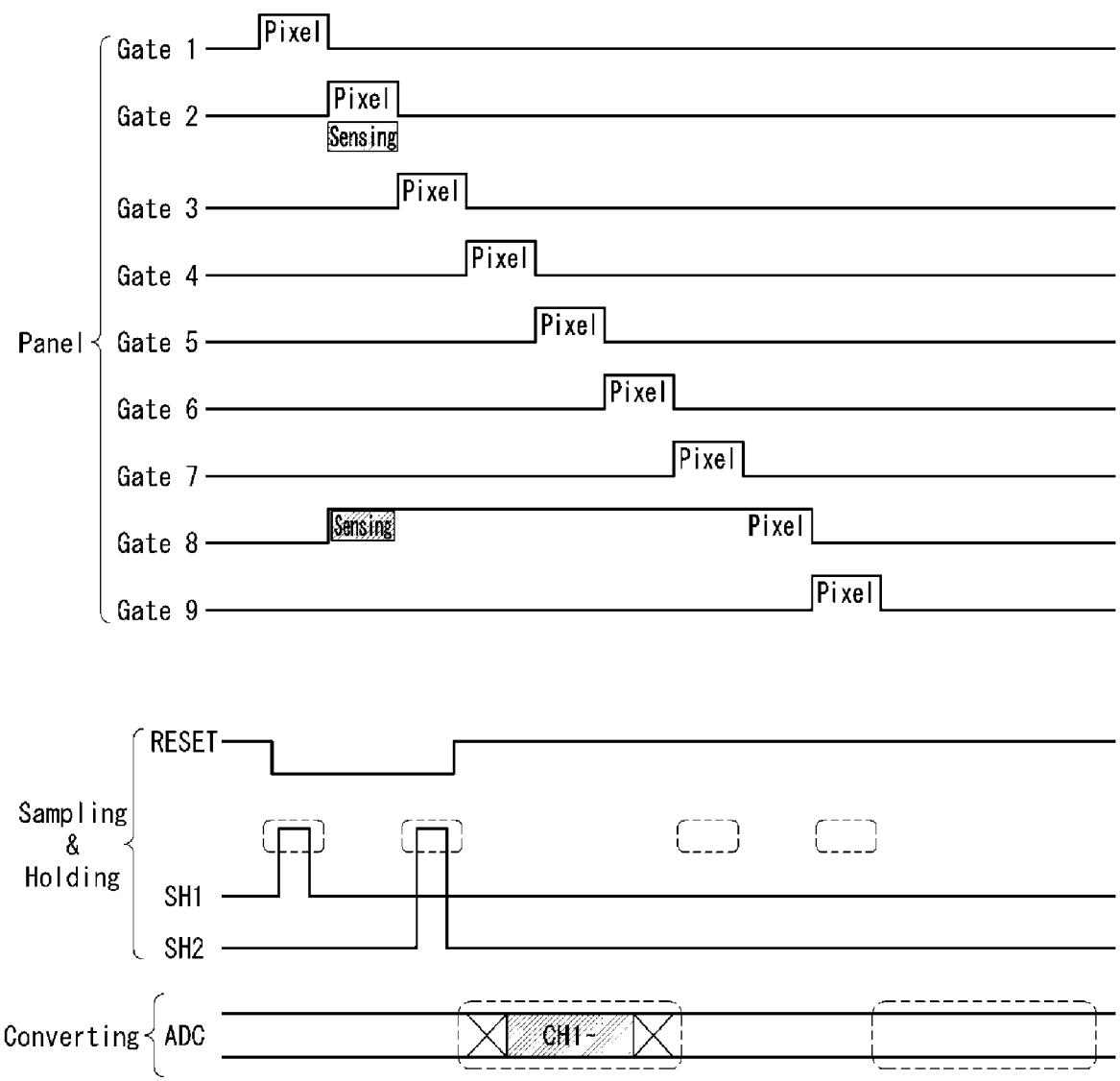
Figure 9:
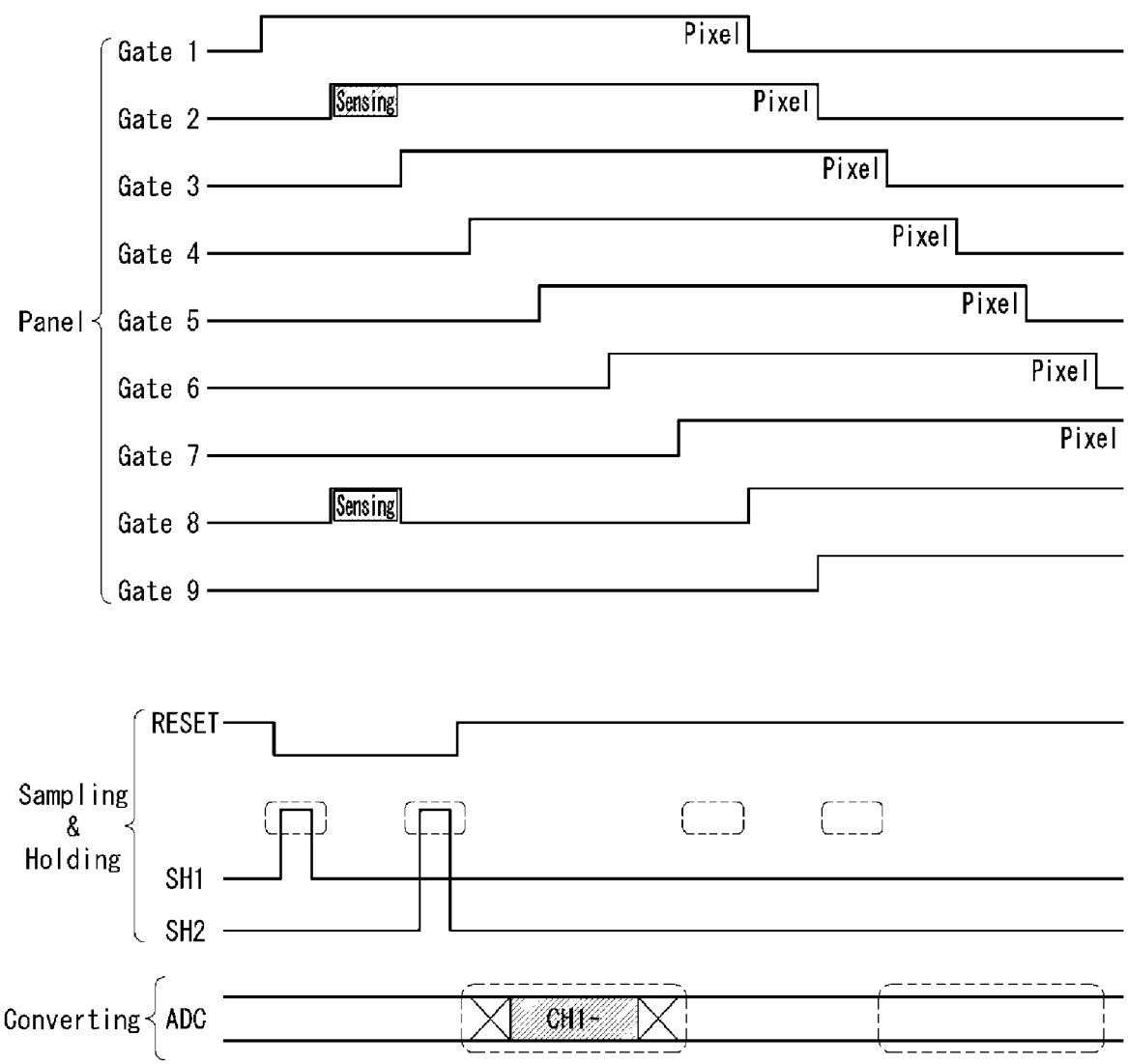
Figure 10:
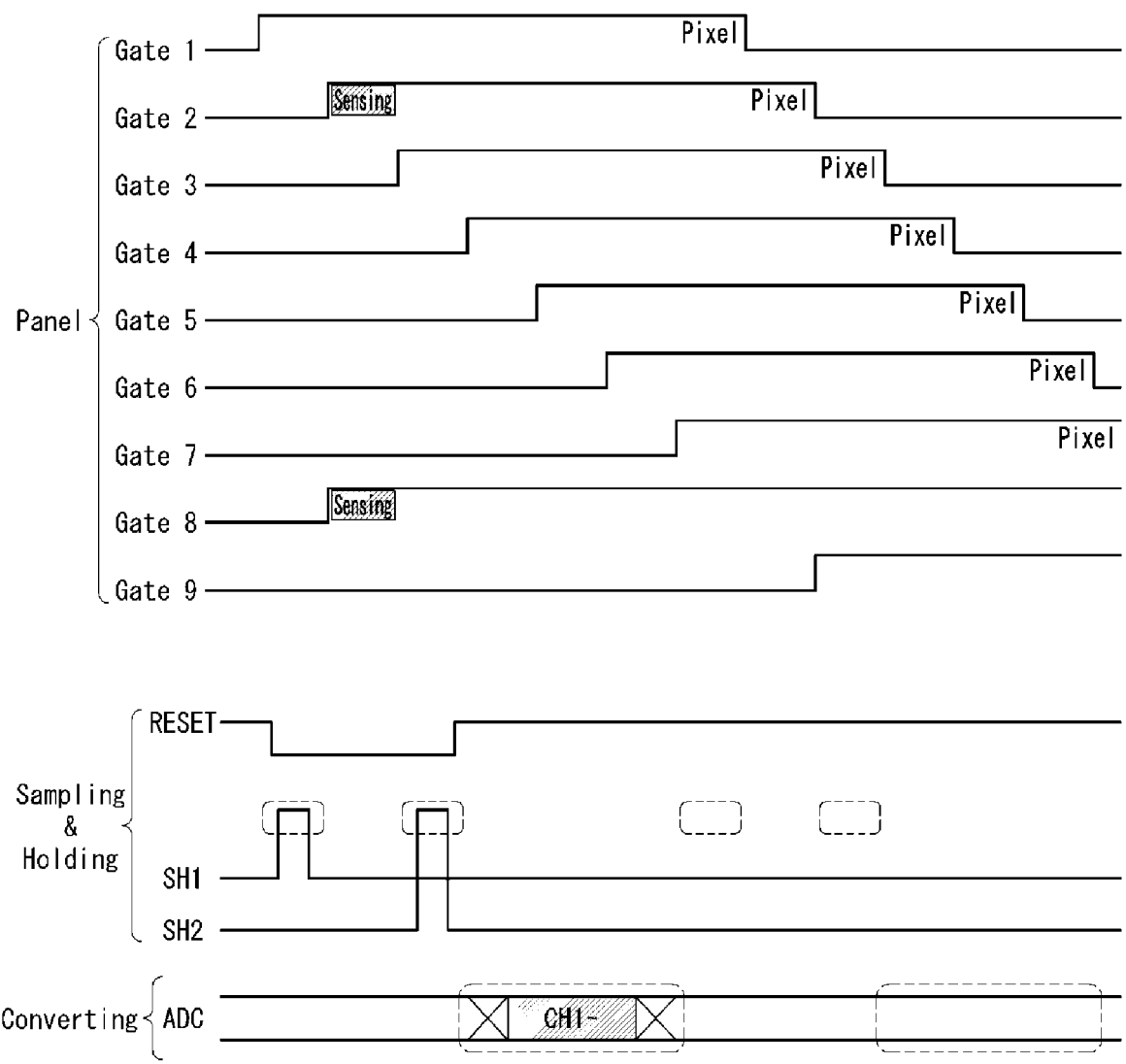

FIGS. 8 to 10 show modified examples of the scan signals of FIG. 5 according to one embodiment.

Figure 11:
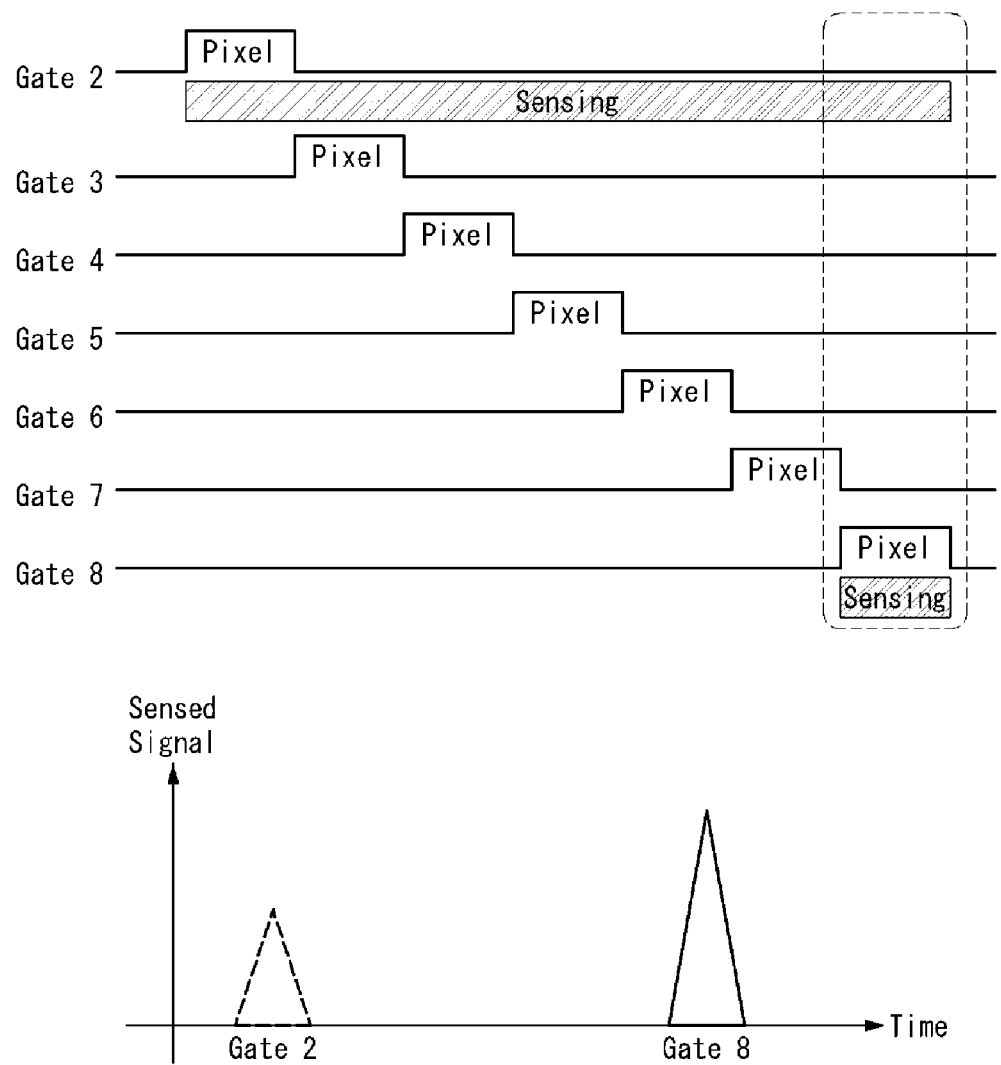

FIG. 11 conceptually shows another embodiment of the present disclosure which changes the operation timings of the sample/hold switches of the sensing unit so as to output signals by adding the outputs of the two photo sensors.

Figure 12:
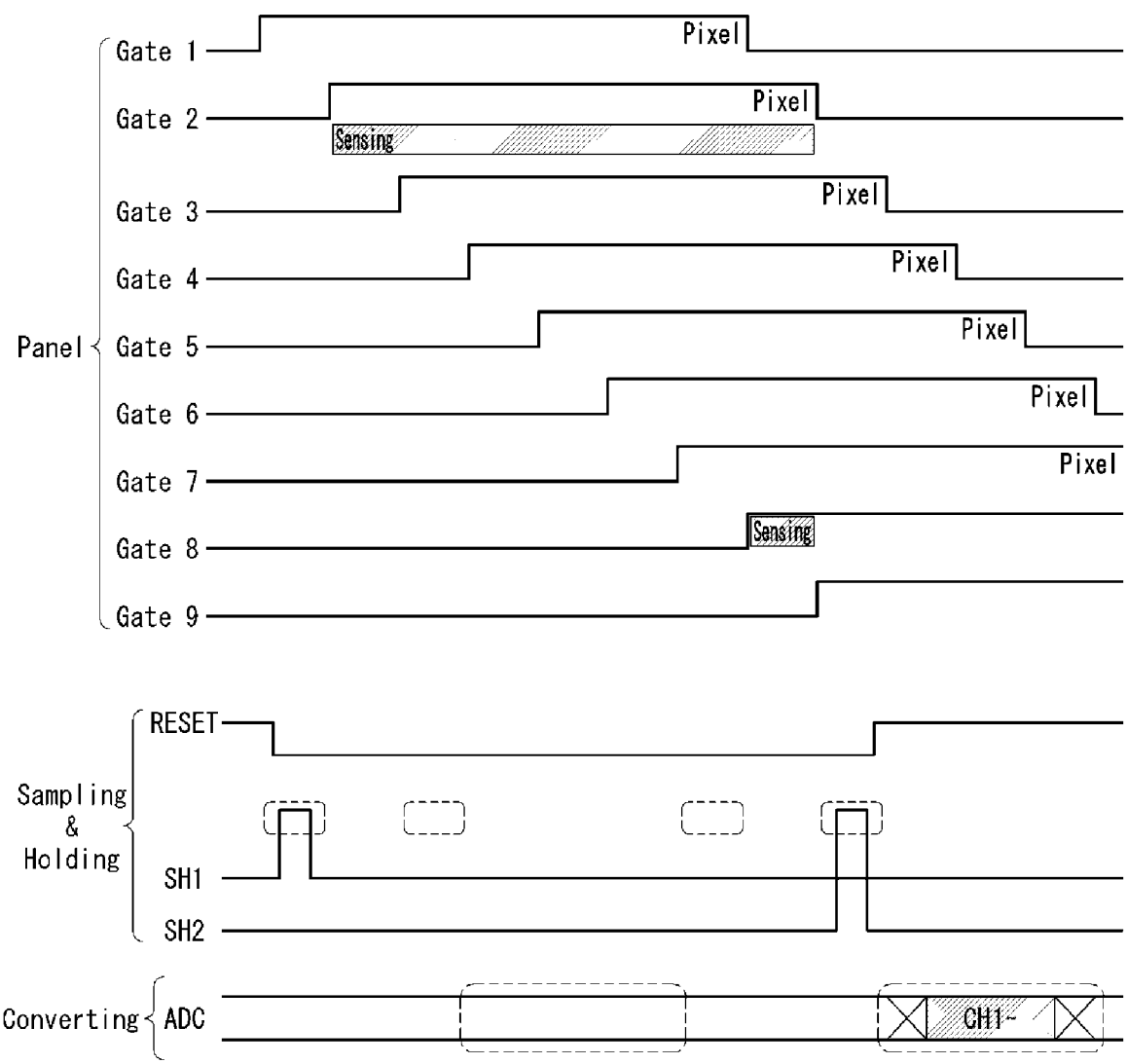

FIG. 12 shows the timings of control signals for the embodiment of FIG. 11 according to one embodiment.

Figure 13:
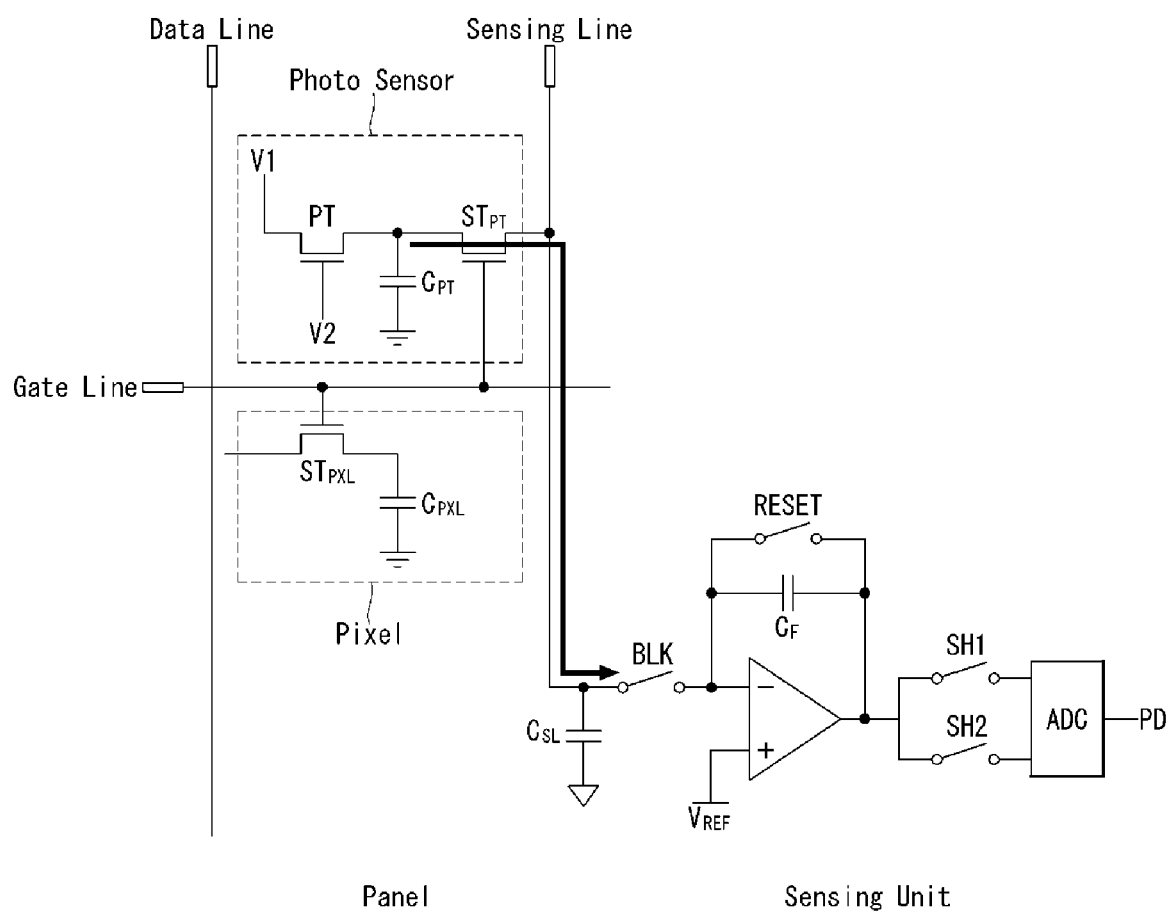

FIG. 13 shows another circuit configuration of the present disclosure which inserts a blocking switch between the photo sensor and the sensing unit according to one embodiment.

Figure 14:
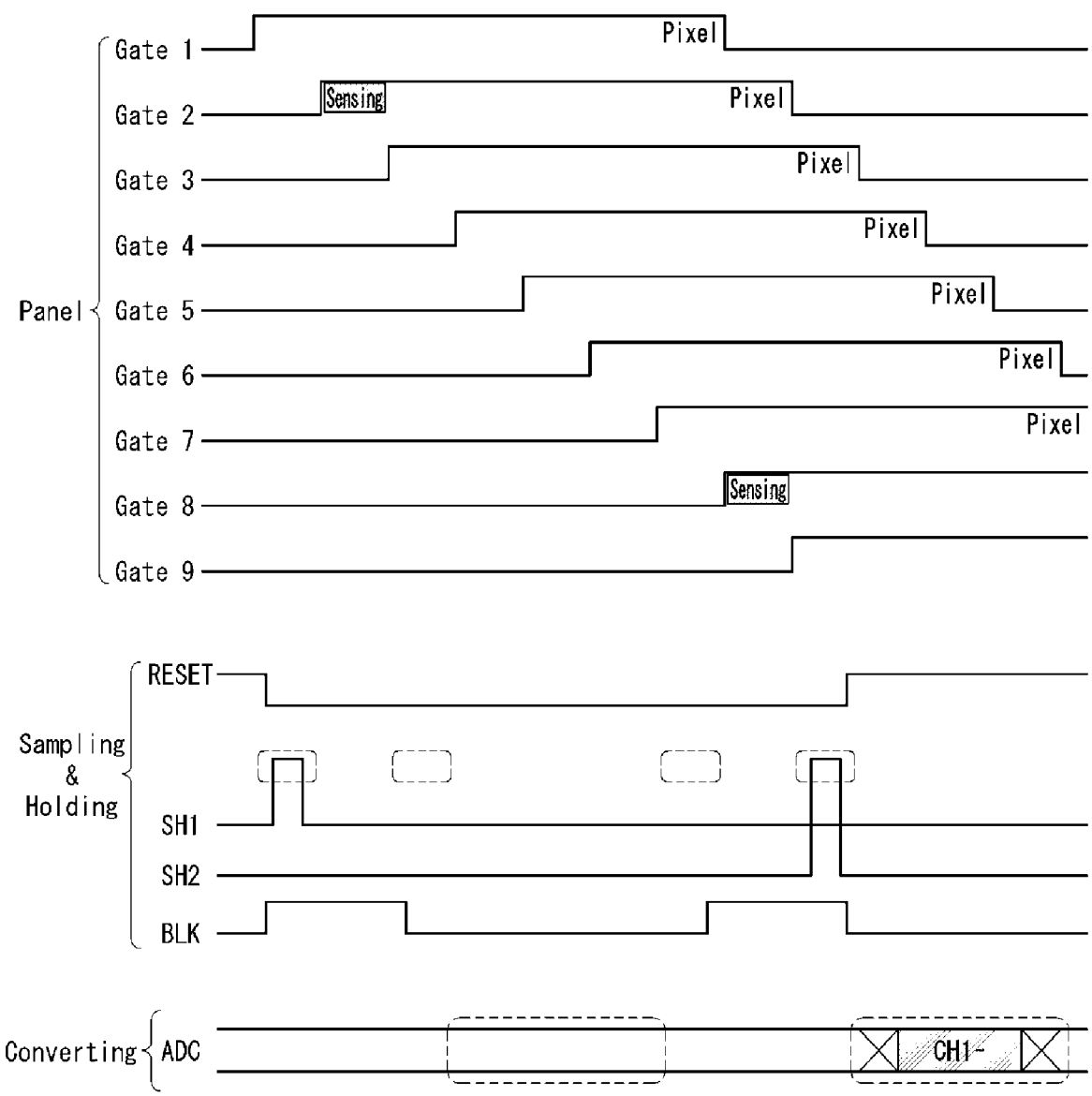
Figure 15:
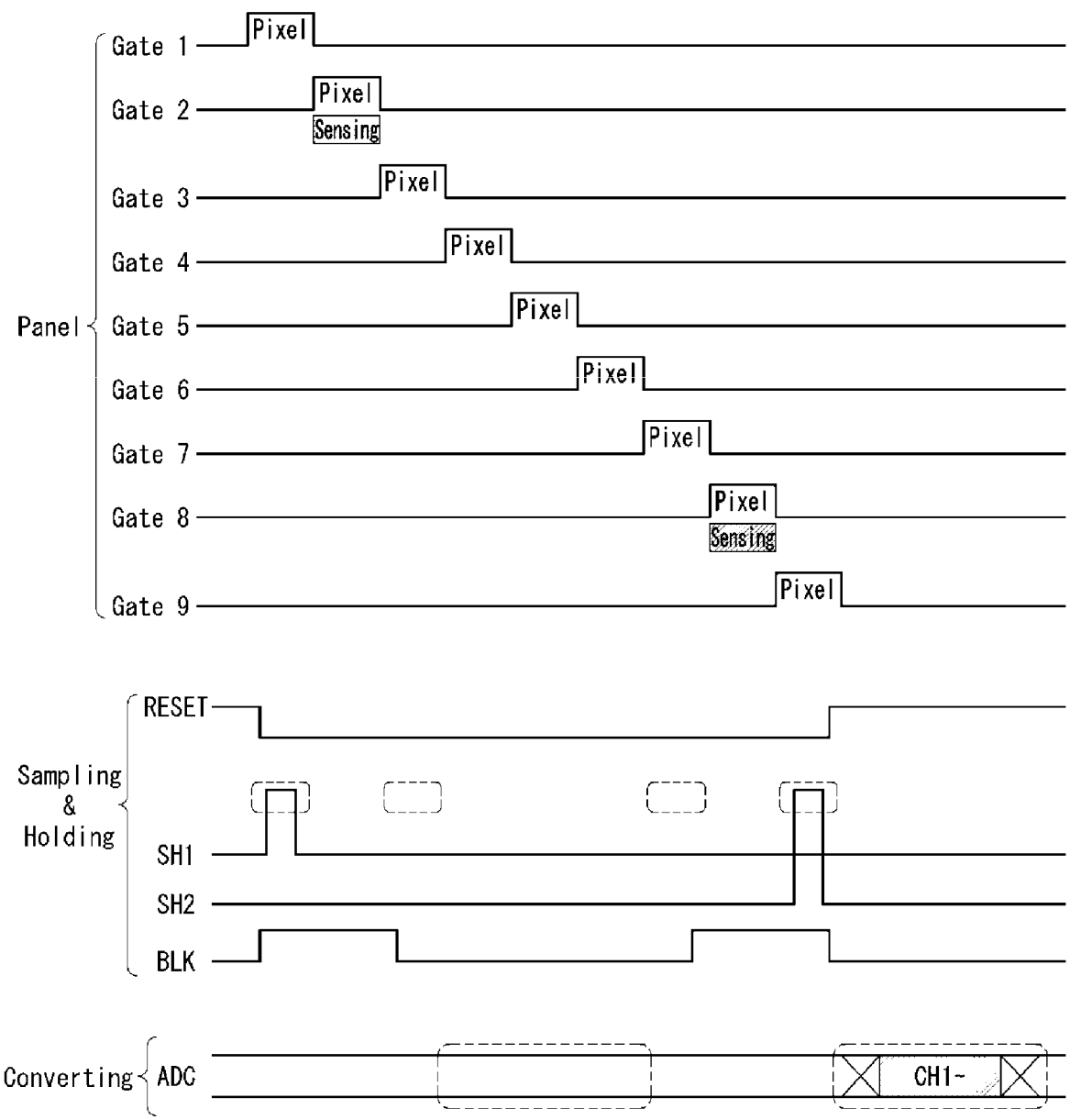

FIGS. 14 and 15 respectively show the timings of the control signals for the circuit configuration of FIG. 13 according to one embodiment.

Figure 16:
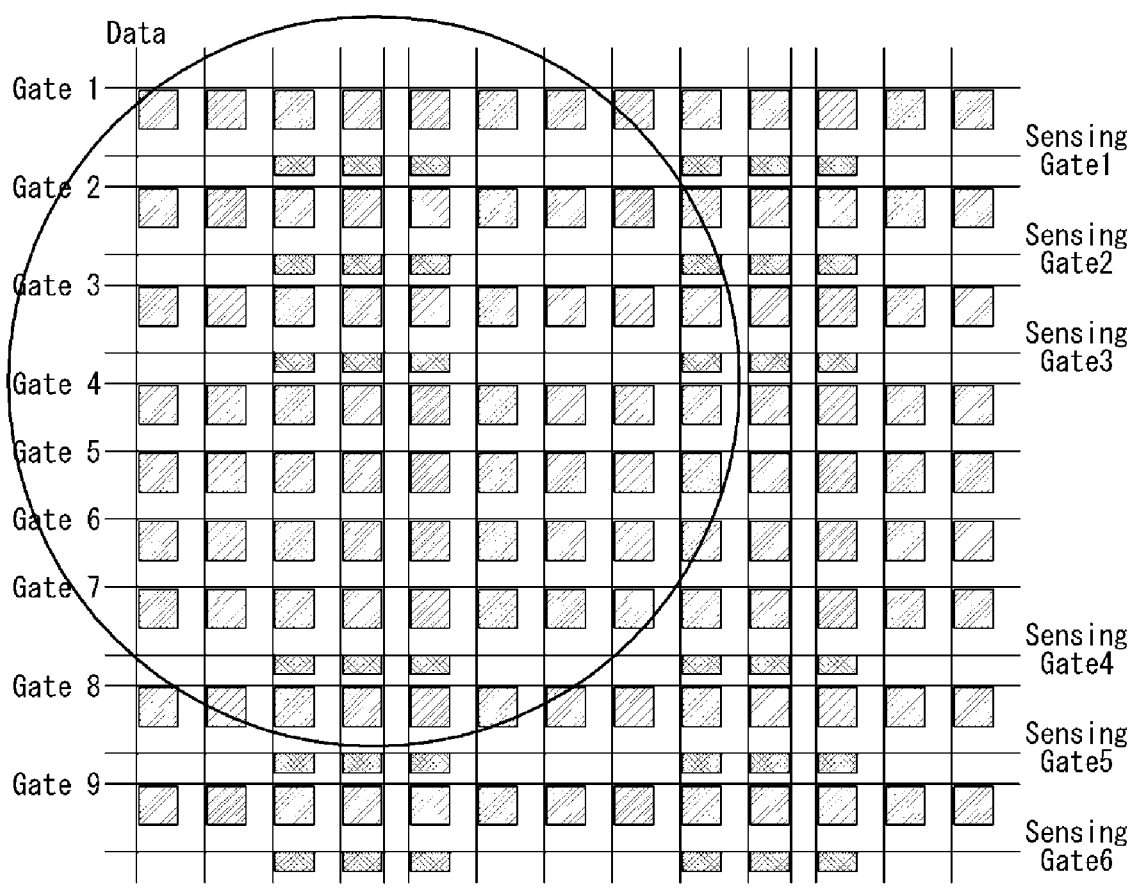

FIG. 16 illustrates another embodiment of the present disclosure in which a plurality of photo sensors are disposed around one pixel according to one embodiment.

Figure 17:
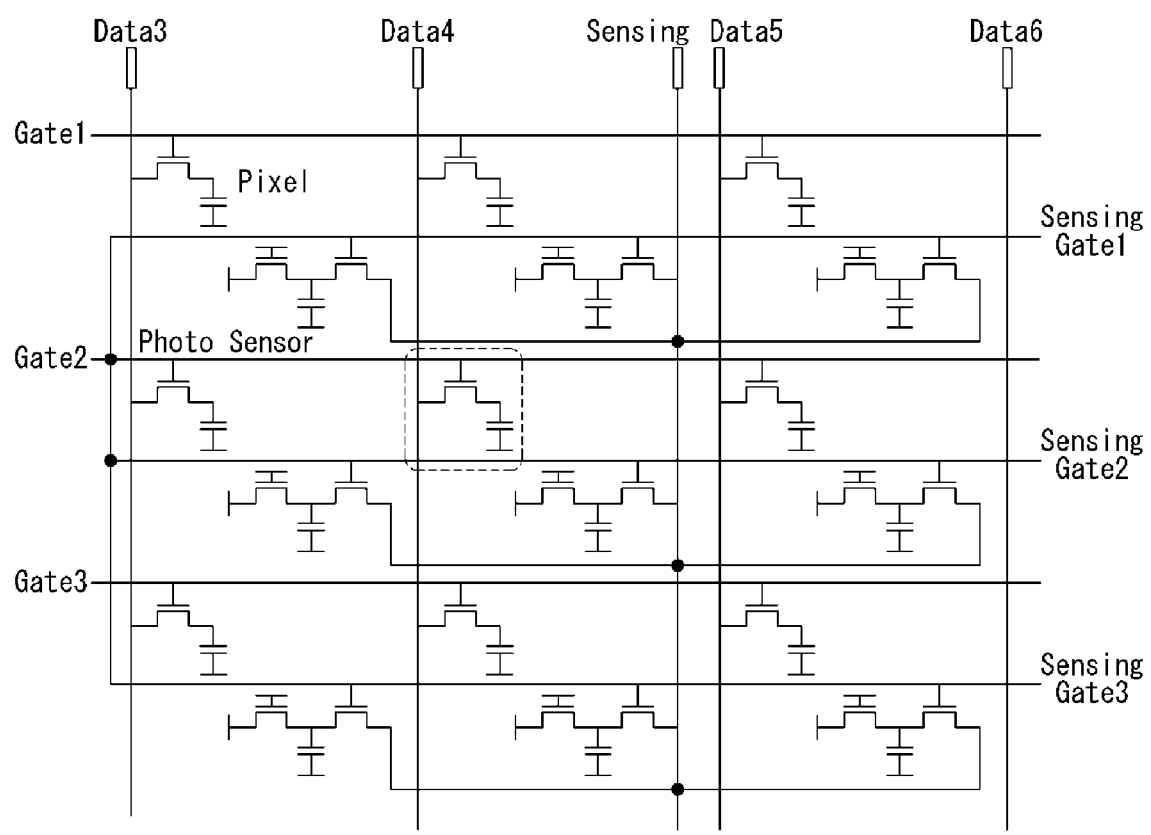

FIG. 17 illustrates the connection of a sensing gate line and a sensing line in the embodiment of FIG. 16 according to one embodiment.

Figure 18:
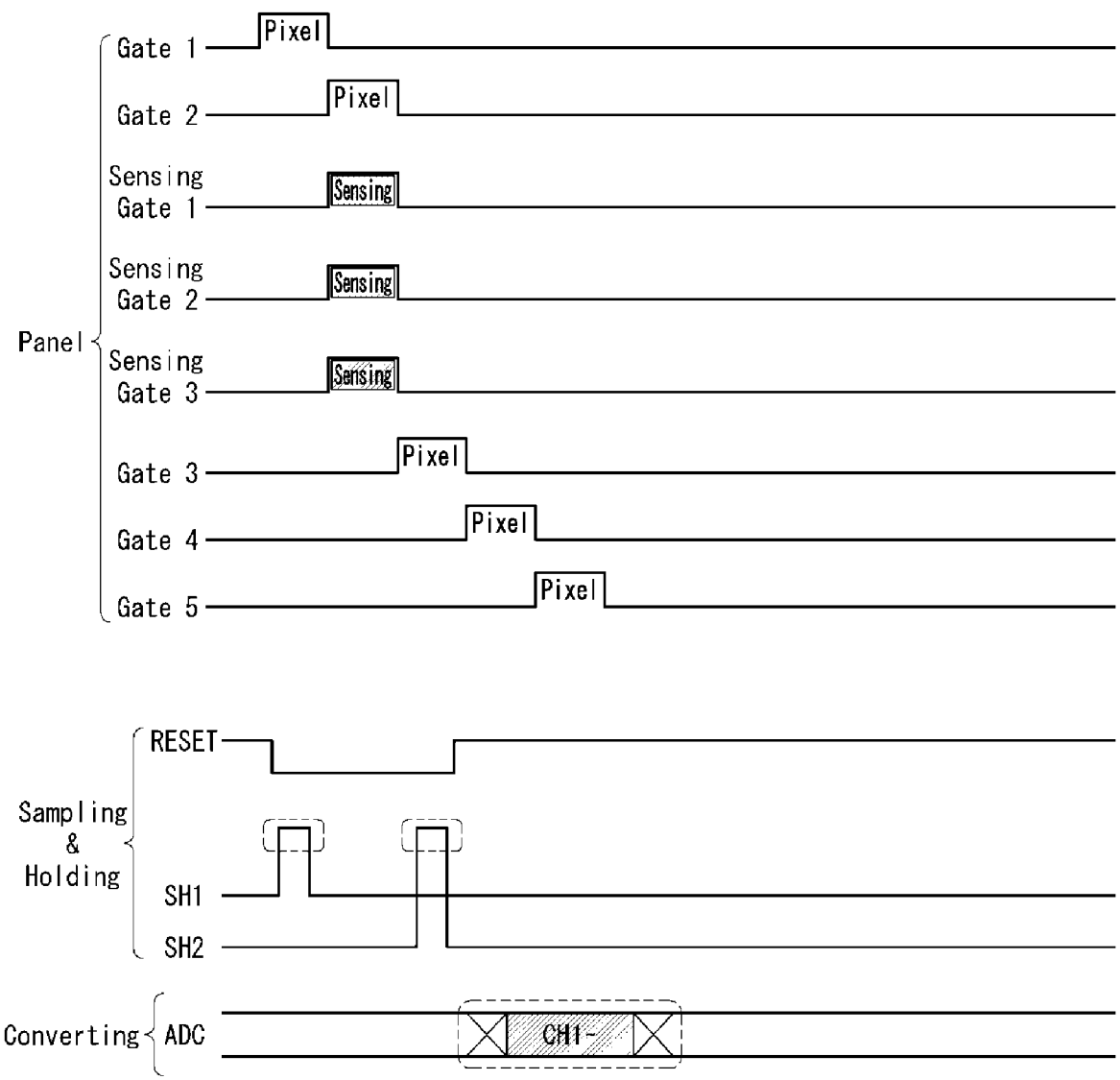

FIG. 18 shows the timings of the control signals for the embodiment of FIG. 16 according to one embodiment.

DETAILED DESCRIPTION

Hereinafter, preferred embodiments of the present disclosure will be described in detail with reference to the accompanying drawings. Same reference numerals throughout the specification denote substantially identical components. In the following description, a detailed description of known functions and configurations incorporated herein will be omitted when it may make the subject matter of the present disclosure rather unclear.

When an object such as a finger, a pen, or a pupil approaches or touches the photo sensor, the quantity of light incident on the photo sensor changes, and when the change in the light amount is processed, the approaching or touched object may be recognized. When a laser beam is incident on the photo sensor from a laser pointer, the photo sensor senses the laser beam and the position information on the incident position of the laser beam may be obtained. Therefore, the photo sensor may be embedded in a display panel and used as an input device such as touch recognition, fingerprint recognition, iris recognition, laser pointer recognition, and the like.

In order for the photo sensor to be built in the display panel and used as an input device for touch or pointer recognition, a photo sensor must be mounted for each pixel or each pixel group of a predetermined number of pixels (for example, n×m pixels), and a wiring for fetching the output of the photo sensor is required.

Figure 1:
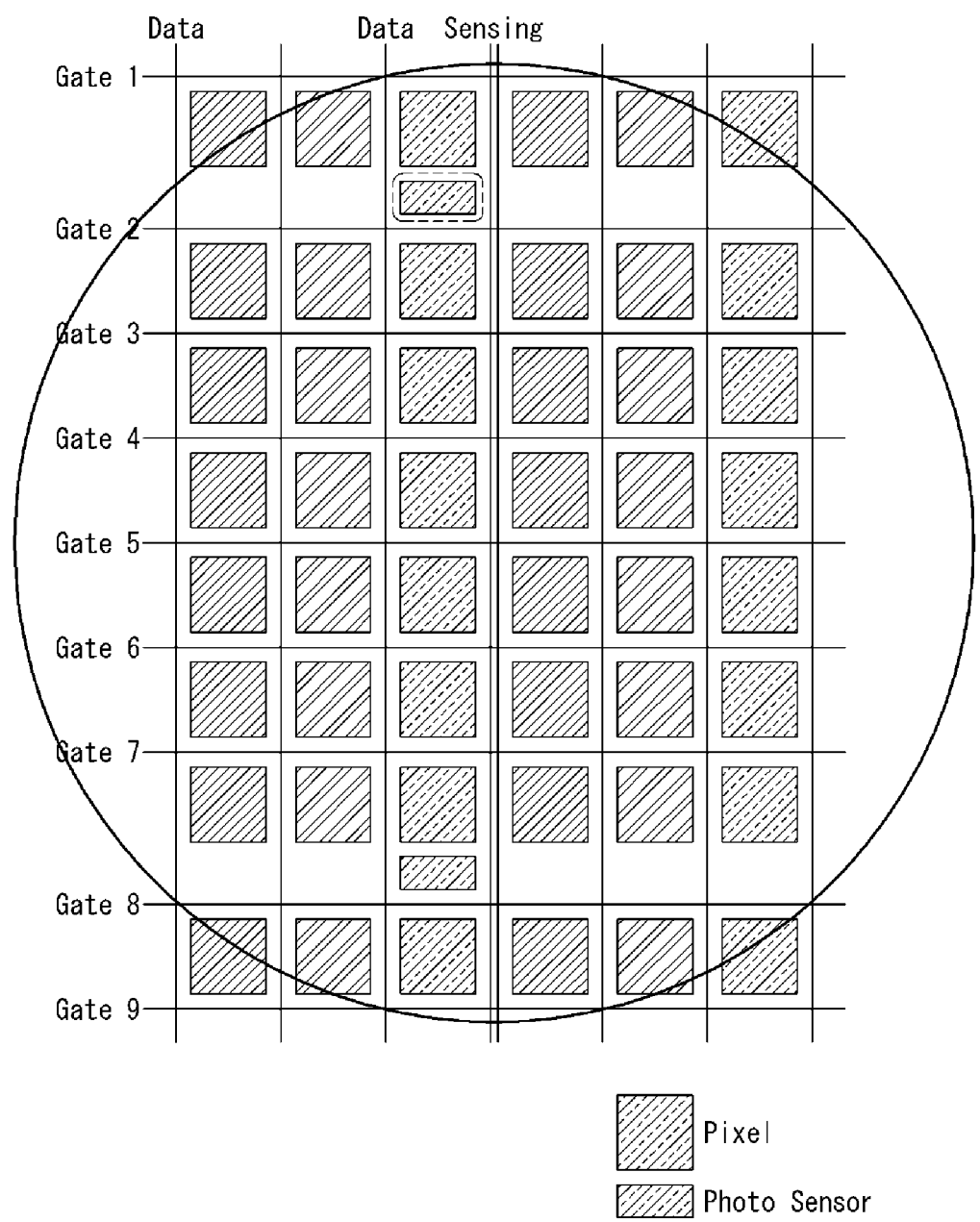
FIG. 1 is an enlarged view of a display panel on which a plurality of pixels and a plurality of photo sensors are arranged according to one embodiment.

FIG. 1 is an enlarged view of a display panel on which a plurality of pixels and a plurality of photo sensors are arranged according to one embodiment.

In FIG. 1, a first photo sensor is connected to a second gate line Gate2, and a second photo sensor is connected to an eighth gate line Gate8. The photo sensors are arranged on one horizontal line at six horizontal line intervals in the vertical direction, that is, the direction in which the data line Data advances. The first photo sensor is connected to a sensing line Sensing when a scan pulse is applied to the second gate line, and the second photo sensor is connected to the sensing line when a scan pulse is applied to the eighth gate line.

In FIG. 1, the circle indicates the diameter of incident light when a laser point is used as a light source for activating the photo sensor. In FIG. 1, the light of the laser pointer is incident on two or more photo sensors based on the vertical direction.

Figure 2:
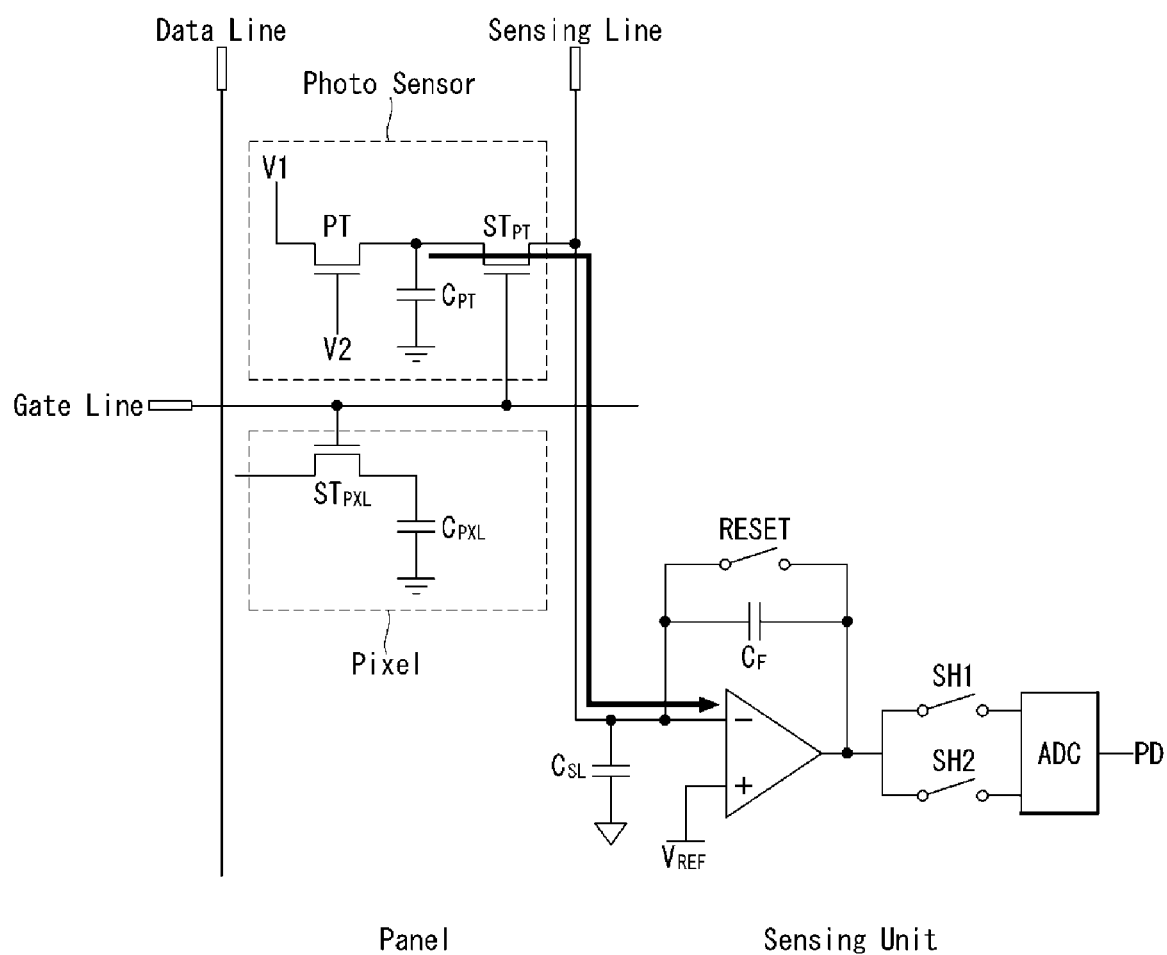
FIG. 2 shows a circuit configuration of a photo sensor and a pixel disposed on a panel and a sensing unit connected to the photo sensor according to one embodiment.

FIG. 2 shows a circuit configuration of a photo sensor and a pixel disposed on a panel and a sensing unit connected to the photo sensor according to one embodiment.

In FIG. 2, the pixel corresponds to a typical liquid crystal pixel circuit comprising a switching thin film transistor (TFT) $ST_{PXL}$ and a storage capacitor $C_{PXL}$, but may be an organic light emitting diode (OLED) pixel circuit comprising an OLED and a driving element for driving the OLED.

The photo sensor comprises a photo TFT PT, a photo capacitor CPT and a switching TFT $ST_{PT}$. Current flows when light is incident on the photo TFT PT from outside. The photo capacitor CPT stores the electric charges according to the current flowing in the photo TFT PT while the switching TFT $ST_{PT}$ maintains its off state. The switching TFT $ST_{PT}$ is turned on in accordance with a scan signal applied through the gate line to supply the voltage of the photo capacitor $C_{PT}$ to the sensing line.

The photo sensor is connected to a sensing unit comprising an integrating circuit and a sample/hold switch through the sensing line. The integrating circuit for integrating the current through the sensing line may comprise an operational amplifier including an inverting terminal connected to the sensing line and a non-inverting terminal connected to a reference voltage $V_{REF}$, a feedback capacitor $C_F$ connected between the inverting terminal and an output terminal, and a reset switch RESET.

The sample/hold switch comprises two sample/hold switches SH1 and SH2 to connect the integrating circuit to an analog-to-digital converter ADC, and the ADC converts the output of the integrating circuit into digital photo data PD.

Figure 3:
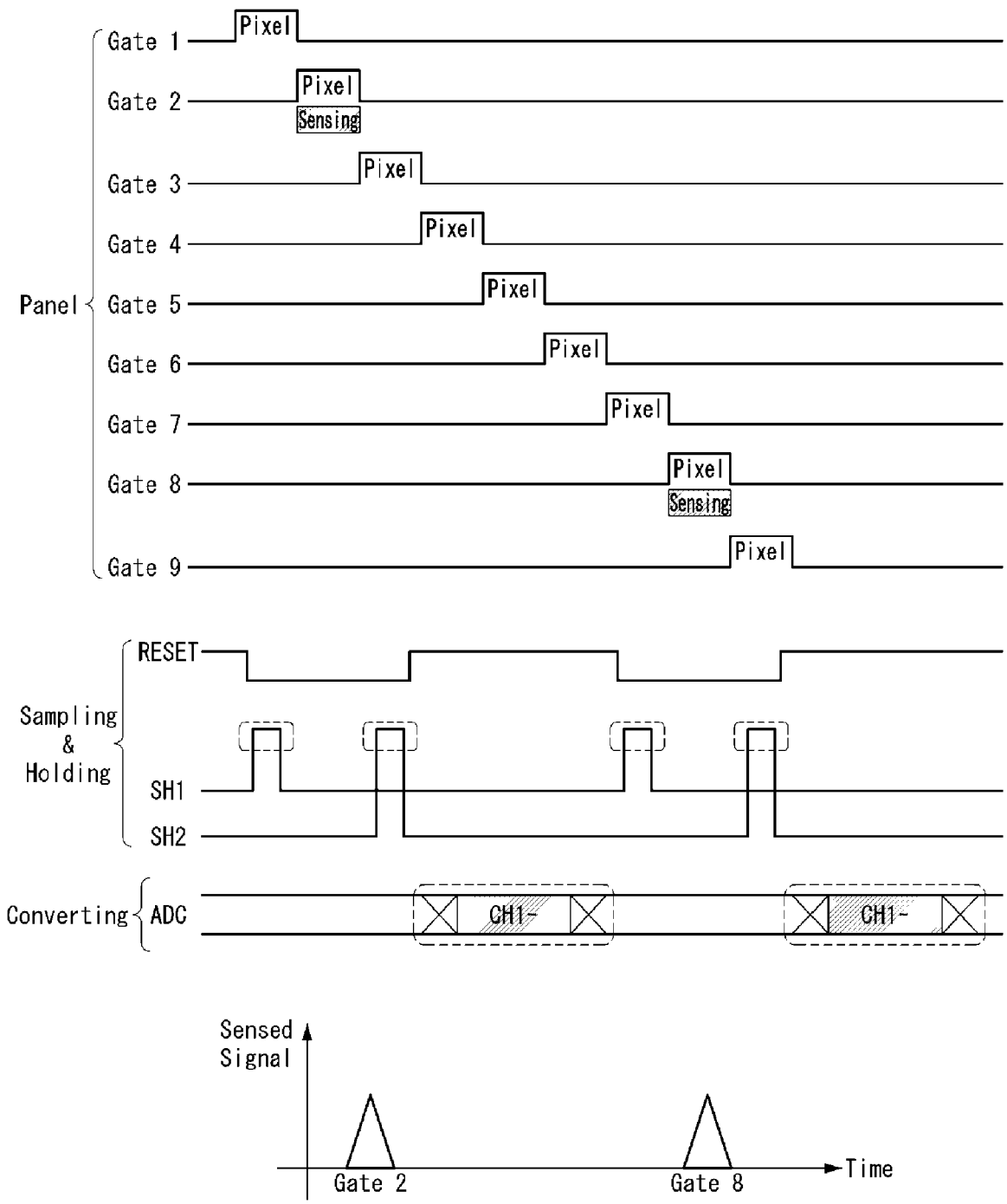
FIG. 3 is a diagram illustrating a case where the pixels display image data and the sensing unit connected to the photo sensors detects signals through sampling/holding/ converting operations responding to the scan signals sequentially applied in the circuit configuration of FIG. 2.

FIG. 3 is a diagram illustrating a case where the pixels display image data and the sensing unit connected to the photo sensors detects signals through sampling/holding/converting operations responding to the scan signals sequentially applied in the circuit configuration of FIG. 2 according to one embodiment.

In order to apply data voltages to the pixels, pulse-shaped scan signals are sequentially applied to the gate lines. When the scan pulses of the second gate line Gate2 and the eighth gate line Gate8 are applied, the photo sensors connected to the second gate line Gate2 and the eighth gate line Gate8 are sequentially connected to the sensing unit through the sensing line.

Before the photo sensor connected to the second gate line Gate 2 is connected to the sensing unit, the reset switch is turned on and then the reset switch in the turn-on state is turned off. The turn-on of the reset switch initializes both terminals of the feedback capacitor CF as well as the output terminal of the operational amplifier to the reference voltage VREF. After the reset switch is turned off, the first sample/hold switch SH1 is turned on to sample the output value of the integrating circuit (the output value corresponds to a value before sensing), that is, the reference voltage VREF stored in the feedback capacitor CF and outputs it to the ADC.

When the first sample/hold switch SH1 is turned off and a gate pulse is supplied to the second gate line Gate2, the switching TFT STPT of the photo sensor is turned on so that the charges stored in the photo capacitor CPT is applied to the integrating circuit through the sensing line and stored in the feedback capacitor CF (Sensing in FIG. 3).

After the gate signal of the second gate line Gate2 is switched to a gate low voltage, the second sample/hold switch SH2 is turned on so that the voltage stored in the feedback capacitor CF is sampled and output to the ADC.

The ADC converts the difference between the digital data value for the reference voltage VREF and the digital data value for the value obtained by integrating the charges of the photo sensor into digital photo data PD. Since a plurality of sensing units are connected to one ADC, the ADC converts the outputs of the plurality of photo sensors connected to the second gate line Gate2 in the horizontal direction in turn into the digital photo data (Converting in FIG. 3).

The photo sensors and the sensing units connected to the eighth gate line Gate 8 operate in the same manner as the photo sensors and sensing units connected to the second gate line Gate 2.

Since each of the photo sensors connected to the gate line is connected to the sensing unit only while the scan pulse is applied to the corresponding gate line, the value obtained by integrating only the output signal of one photo sensor is not so large and affected by the data transitions occurring in near data lines during the application of the scan pulse. So, a malfunction may occur when the photo sensor is used as an input device.

In order to increase the level of a sensing signal, the present disclosure may add the output signals of two or more photo sensors, by changing the scan signal applied to the gate line connected to the photo sensor, or by changing the operation timings of the sample/hold switches of the sensing unit, or by increasing the number of photo sensors connected to the sensing line.

FIG. 4 conceptually illustrates one embodiment of the present disclosure which simultaneously applies scan signals to two photo sensors and outputs signals by summing the outputs of the two photo sensors, and FIGS. 5 and 6 are respectively timing charts of control signals for the embodiment of FIG. 4.

In FIGS. 4 and 5, as in FIGS. 1 and 3, the photo sensors are arranged on one horizontal line at six horizontal line intervals in the vertical direction, that is, the direction in which the data lines travel. One photo sensor may be disposed for every predetermined number of pixels (for example for every six pixels similarly to the vertical direction) in the horizontal direction, i.e., the direction in which the gate lines controlling the supply of data to the pixels travel. In this case, the resolution of the photo sensors corresponds to ⅙ of that of the pixels.

Since the photo sensors arranged in a same column in the direction in which the data lines travel share a same sensing line and are connected to the sensing unit through them, the sensing lines and the sensing units are formed on the display panel by the number of the photo sensors arranged in the horizontal direction. Each sensing line and sensing unit forms a sensing channel.

In a situation where photo sensors are disposed on horizontal lines through which the second gate line Gate 2 and the eighth gate line Gate 8 pass so the photo sensors are connected to one of the second gate line and the eighth gate line, scan signals are sequentially applied to the gate lines to write the data voltages to the pixels.

However, in FIG. 5, by simultaneously applying the scan pulse to the eighth gate line at the timing of applying the scan pulse to the second gate line without applying a data voltage to the pixel on the eight gate line, a pair of photo sensors which share a same sensing line parallel to the data line is simultaneously connected to a sensing unit, among the photo sensors (a plurality of photo sensors in the horizontal direction) connected to the second gate line and the photo sensors (a plurality of photo sensors in the horizontal direction) connected to the eighth gate line.

First, the reset switch RESET of the integrating circuit included in the sensing unit shown in FIG. 2 is turned on to initialize both terminals of the feedback capacitor CF to the reference voltage VREF.

Before the scan pulses are simultaneously applied to the second gate line Gate2 and the eighth gate line Gate8, the reset switch RST of the turn-on state is turned off, and then the first sample/hold switch SH1 is turned on, so the output value of the integrating circuit before sensing, that is, the reference voltage VREF stored in the feedback capacitor CF is sampled and output to the ADC.

The scan pulses are simultaneously applied to the second gate line Gate2 and the eighth gate line Gate8 and the scan pulses maintain their gate high voltage VGH after the first sample/hold switch SH1 is turned off, the switching TFTs STPT of two photo sensors connected to the second gate line Gate2 and the eighth gate line Gate8 are turned on to apply the charges stored in the photo capacitors CPT of the two photo sensors to the integrating circuit via the sensing line and store the charges in the feedback capacitor CF.

After the gate pulses of the second gate line Gate2 and the eighth gate line Gate8 are switched to the gate low voltage, the second sample/hold switch SH2 is turned on and the voltage stored in the feedback capacitor CF is sampled and output to the ADC.

In FIG. 5, signals for controlling the reset switch RESET and the first and second sample/hold switches SH1 and SH2 are commonly applied to all sensing units (or all sensing channels).

The ADC calculates the difference between the digital data value for the reference voltage VREF and the digital data value for integrating the charges of the two photo sensors connected to the second gate line Gate 2 and the eighth gate line Gate 8 into digital photo data PD, and sequentially converts the outputs of all the sensing channels into digital photo data. That is, the ADC sequentially converts the outputs of the plurality of photo sensor pairs connected to the second gate line Gate2 and the eighth gate line Gate8 in the horizontal direction into the digital photo data in turn.

However, when the scan pulse is applied to the eighth gate line Gate8 in order to apply data voltages to the pixels connected to the eighth gate line Gate8 (the pixels disposed in the eighth horizontal line or pixel line) after applying the scan pulse to the seventh gate line Gate7, the sensing unit may not perform a photo sensing operation. In this case, the sensing resolution of the photo sensors in the vertical direction is reduced to half.

Meanwhile, as shown in FIG. 6 different from FIG. 5, by simultaneously applying the scan pulse to the fourteenth gate line Gate 14 under six horizontal lines when applying the scan pulse the eighth gate line Gate8 in order to apply data voltages to the pixels of the eighth horizontal line and by controlling the reset switch RESET and the first and second sample/hold switches SH1 and SH2 for the photo sensing operation, the output signals of two photo sensors connected to the eighth gate line Gate8 and the fourteenth gate line Gate14 may be added together.

By successively driving two photo sensors simultaneously in the order such as (2, 8) horizontal lines, (8, 14) horizontal lines and (14, 20) horizontal lines, the original sensing resolution of the photo sensors may be maintained in the vertical direction unlike FIG. 5.

By summing the outputs of two photo sensors as shown if FIG. 4, the level of a sensing signal may be doubled as compared with the case where the sensing signal is generated using only one photo sensor.

FIG. 7 is a block diagram of a display device according to the present disclosure.

The display device in the present disclosure may include a display panel 10, a timing controller 11, a data driving circuit 12, a gate driving circuit 13, and a sensing driving circuit 14.

The display device in FIG. 7 may further comprise a power supply circuit (not shown) for generating and applying voltages required for operations of the display panel 10, the data driving circuit 12, the gate driving circuit 13, and the sensing driving circuit 14 by using an external power supply, and may further comprise a touch driving circuit (not shown) for driving touch sensors.

In the display panel 10, a plurality of data lines 15 and a plurality of sensing lines 17 arranged in the column direction (first direction) and a plurality of gate lines 17 arranged in the row direction (second direction) 16 cross each other, and pixels PXL are arranged in a matrix form for each crossing region to form a pixel array. Scan signals are supplied to the gate lines 16 for controlling the application of data voltages.

In the pixel array, pixels PXL disposed on a same horizontal line are connected to one of the data lines 15 and a corresponding gate line 16 to form a pixel line or a horizontal line. The pixel is electrically connected to the data line 15 in response to a scan signal input through the gate line 16 to receive the data voltage. The pixels arranged on a same pixel line operate simultaneously according to the scan signal applied from a same gate line 16.

A pixel unit may be composed of three subpixels including a red subpixel, a green subpixel, and a blue subpixel or four subpixels including a red subpixel, a green subpixel, a blue subpixel, and a white subpixel, but is not limited thereto.

The display panel 10 displays an image in response to the scan signals supplied from the gate drive circuit 12 and the data signals supplied from the data drive circuit 12. The pixels PXL included in the display panel 10 emit light themselves or control external light.

One pixel includes a switching TFT connected to the gate line 16 and the data line 15 and a pixel circuit operating in accordance with the data signal supplied through the switching TFT. The display panel may be constituted by a liquid crystal display panel including liquid crystal elements or an organic light emitting display panel including organic light emitting elements according to the configuration of a pixel circuit.

When the display panel 10 is constituted by a liquid crystal display panel, the display panel 10 may be implemented as a twisted nematic TN mode, a vertical alignment VA mode, an in plane switching IPS mode, a fringe field switching FFS or an electrically controlled birefringence ECB mode. The display panel 10 may be implemented as a top emission type, a bottom emission type, or a dual emission type in the case of an organic light emitting display panel.

In the display panel 10, one photo sensor PS may be arranged in a pixel unit group which is constituted by n (horizontal direction) and m (vertical direction) pixels. Each photo sensor PS may be connected to one of the gate lines 16 running in the horizontal direction and one of the sensing lines 17 running in the vertical direction. In addition, voltage lines (V1 and V2 in FIG. 2) for the operation of the photo TFT may be connected to each photo sensor. The photo sensor may comprise a photo TFT, a photo capacitor, and a switching TFT.

The TFTs constituting the pixel and the photo sensor may be implemented as a p-type or an n-type or as a hybrid type in which P-type and N-type are mixed. It should be noted that the source and drain of the MOSFET are not fixed. For example, the source and drain of the MOSFET may vary depending on the applied voltage. In the following embodiments, the disclosure should not be limited due to the source and drain of the transistor, and the source and drain electrodes may be referred to as first and second electrodes without distinguishing between the source and the drain electrodes.

Touch sensors may be arranged in the display panel 10. Touch input may be sensed using separate touch sensors or may be sensed through pixels. The touch sensors may be disposed on the display panel 10 in an on-cell type or an add-on type, or implemented as in-cell type touch sensors embedded in the pixel array.

The timing controller 11 supplies image data RGB transmitted from an external host system (not shown) to the data driving circuit 12. The timing controller 11 receives, from the host system, timing signals, such as a vertical synchronization signal Vsync, a horizontal synchronization signal Hsync, a dot clock signal CLK, and a data enable signal DE and generates control signals for controlling the operation timings of the data driving circuit 12, the gate driving circuit 13 and the sense driving circuit 14, based on the timing signals. The control signals may include the gate timing control signal GCS for controlling the operation timings of the gate driving circuit 13 and the data timing control signal DCS for controlling the operation timings of the data driving circuit 12.

The timing controller 11 may perform a photo sensing operation in the display period in which display driving is performed in which data voltages are applied to pixels and gray levels corresponding thereto are displayed. The photo sensing operation detects the charges stored in the photo sensor by incident light using the scan signal applied to the gate line 16 to control the application of the data voltages.

In the display period, the timing controller 11 controls the gate driving circuit 14 and the sensing driving circuit 14 to perform the photo sensing operation which receives the digital photo data PD from the sensing driving circuit 14, applies a predetermined coordinate algorithm to generate coordinate data corresponding to the input through the photo sensor, and transfers the coordinate data to the connected host system. The coordinate data may be used as a touch input or a pointer input.

That is, the timing controller 11 may compare the input digital photo data PD with a reference value, determine that there is a touch or a pointer input in the photo sensor that outputs the digital photo data PD exceeding the reference value, and calculate the coordinate of the corresponding photo sensor. When the digital photo data PD output from a plurality of photo sensors constituting one cluster is larger than the reference value, the timing controller 11 may more clearly judge that there is a touch or a pointer input in the corresponding area and calculate the center coordinate of the corresponding area.

When the host system receives the coordinate information corresponding to the digital photo data PD from the timing controller 11, the host system may perform an operation corresponding to the touch generated in the coordinate, or generate an image (for example, a circle of a red color having a predetermined size) expressing that there is a touch or a pointer input in the coordinate, superimpose the generated image on the image data to be displayed on the display panel 10 and output the superimposed image data to the timing controller 11.

Under the control of the timing controller 11, the data driving circuit 12 samples and latches digital video data RGB input from the timing controller 11 to convert them into parallel data, converts the parallel data into analog data voltages according to gamma reference voltages, and outputs them to the data lines 16 via output channels. The data voltage may be a value corresponding to the gradation to be expressed by the pixel. The data driving circuit 12 may be composed of a plurality of source drive ICs.

The gate driving circuit 13 generates scan signals in a row sequential manner while sequentially shifting the level of the gate driving voltage based on the gate control signal GDC and sequentially supplies the generated scanning signals to the gate lines 16 connected to the pixels disposed on respective pixel lines.

The gate drive circuit 13 may be composed of a plurality of gate drive integrated circuits each of which includes a shifter register, a level shifter for converting the output signal of the shift register into the signal having the swing magnitude suitable for driving the TFTs in the pixel, and an output buffer. Alternatively, the gate driving circuit 13 may be formed directly on the lower substrate of the display panel 10 using a GIP (gate drive IC in panel) method. In the case of the GIP method, the level shifter may be mounted on a PCB, and the shift register may be formed on the lower substrate of the display panel 10.

In order to simultaneously drive two photo sensors which are disposed on different horizontal lines and share a same sensing line, the gate driving circuit 13 may apply a scan pulse in advance to the gate line of a following horizontal line (behind six horizontal lines in FIGS. 4 to 6) where the photo sensors are disposed, in synchronization with applying the scan pulse to write data to the pixels of the horizontal line on which the photo sensors are disposed, as shown in FIGS. 5 and 6.

The sensing driving circuit 14 may include a plurality of sensing units, an analog-to-digital converter ADC, and a multiplexer (not shown) for connecting the plurality of sensing units to the ADC to perform the photo sensing operation. And, the sensing driving circuit 14 generates digital photo data PD and provides it to the timing controller 11 in accordance with the photo sensing operation.

Under the control of the timing controller 11, the sensing driving circuit 14 generates an output voltage corresponding to the sum of the charges stored in the photo capacitors of two photo sensors when the two photo sensors of the display panel 10 are connected to the sensing unit via the sensing line 17, converts it into photo data PD and outputs it to the timing controller 11, by controlling the operations of the reset switch RESET, sample/hold switches SH1 and SH2, a multiplexer (not shown) and the ADC.

Since the sensing driving circuit 14 is connected to the sensing lines 17 arranged in parallel with the data line 15, it can be integrated into one driving circuit with the data driving circuit 12.

FIGS. 8 to 10 show modified examples of the scan signals of FIG. 5. Instead of the scan signals and the control signals for the sensing unit in FIG. 5, the scan signals and the control signals for the sensing unit in FIG. 6 may be modified.

In FIG. 5, when applying a scan pulse to the second gate line Gate2 to write data to the pixels on the second horizontal line where the photo sensors are disposed, a scan pulse is also applied to the eighth gate line Gate8 corresponding to the eighth horizontal line where the photo sensors are disposed next to the second horizontal line. Thereafter, the scan pulse is applied again to the eighth gate line Gate8 when data is written to the pixels on the eighth horizontal line.

However, in FIG. 8, when a scan pulse of a gate high voltage capable of turning on the switching TFT is applied to the second gate line Gate2, the scan pulse of the gate high voltage is applied to the eighth gate line Gate8. As shown in FIG. 8, the gate high voltage of the gate pulse applied to the eighth gate line Gate8 may be maintained at the gate high voltage until data is to be written to the pixels on the eighth horizontal line.

FIG. 9 corresponds to the case where pixels are driven in such a manner that scan pulses applied to the gate lines overlap each other between adjacent gate lines. Similar to FIG. 5, by applying a scan pulse to the eighth gate line Gate8 when applying a scan pulse to the second gate line Gate2, the output signals of the photo sensors disposed on the second horizontal line and the eighth horizontal line may be summed. In FIG. 9, data is supplied to the data line at the timings where "Pixel" is written.

FIG. 10 corresponds to the case where the embodiment of FIG. 8 is applied to the scan signals of FIG. 9. The gate pulse applied to the eighth gate line Gate8 maintains the gate high voltage until data is written to the pixels of the eighth horizontal line from the time when the scan signal of the gate high voltage is applied to the second gate line Gate2.

In the embodiments of FIGS. 4 to 6 and FIGS. 8 to 10, the scan signals supplied to the gate lines are adjusted so that the output signals of the two photo sensors which are arranged on different horizontal lines and connected to a same sensing line are summed. The embodiments are not limited thereto, and the output signals of the three or more photo sensors which are arranged on different horizontal lines and connected to a same sensing line may be summed.

FIG. 11 conceptually shows another embodiment of the present disclosure which changes the operation timings of the sample/hold switches of the sensing unit so as to output signals by adding the outputs of the two photo sensors, and FIG. 12 shows the timings of control signals for the embodiment of FIG. 11.

In FIG. 11, instead of changing the scan signals applied to the gate lines, by changing the operating timings of the switches included in the sensing unit, the output signals of two photo sensors which are arranged on different horizontal lines and connected to a same sensing line are summed.

In FIG. 11, with respect to two photo sensors which are arranged on different horizontal lines and connected to a same sensing line, the output signals of the photo sensors are summed and output at the timing at which the scan pulse is supplied later but not at the timing at which the scan signal is first supplied.

First, around the time at which a scan pulse is applied to the second gate line Gate2, the first sample/hold switch SH1 is turned on, and the reference voltage VREF stored in the feedback capacitor CF of the integrating circuit is sampled to be output to the ADC.

Thereafter, if the scan pulse is applied to the second gate line Gate2 after the first sample/hold switch SH1 is turned off, the photo sensor disposed on the second horizontal line is connected to the sensing line and the charges stored in the photo capacitor are transferred through the sensing line and stored on the feedback capacitor CF of the integrating circuit. After that, if a scan pulse is applied to the eighth gate line Gate8, the photo sensor disposed on the eighth horizontal line is connected to the sensing line and the charges stored in the photo capacitor are transferred through the sensing line to the integrating circuit and additionally stored in the feedback capacitor CF, so the voltage of the output terminal of the operational amplifier is changed.

If the scan signal of the eighth gate line Gate8 is changed to a gate low voltage and the second sample/hold switch Sh2 is turned on, the charges stored in the two photo sensor disposed on the second and eighth horizontal lines are summed in the feedback capacitor CF and the voltage stored in the feedback capacitor CF is sampled and output to the ADC.

The ADC converts the difference between the digital data value of the reference voltage VREF and the digital data value for the integrating value of summing the charges of the two photo sensors into digital output data PD, thereby obtaining a signal having a level higher than that of a signal sensed by only one photo sensor.

FIG. 12 applies the case of driving pixels in such a way that the scan pulses applied to the gate lines overlap each other between neighboring gate lines to FIG. 11.

First, while a scan signal of a gate high voltage of a turn-on level is applied to the second gate line Gate2 (a period longer than one horizontal period), a photo sensor connected to the second horizontal line is connected to the sensing line and the charges stored in the photo sensor are converted into a voltage in the integrating circuit.

Then, until a predetermined time (for example, one horizontal period) elapses after the gate pulse of the gate high voltage is applied to the eighth gate line Gate8 (until the second sample/hold switch SH2 of the sensing circuit is turned on), the photo sensor connected to the eighth horizontal line is connected to the sensing line, and the charges stored in the photo sensor are further converted into a voltage in the integrating circuit.

In the case of FIG. 12, since the photo sensor disposed on the second horizontal line is connected to the sensing unit through the sensing line while the scan signal of the gate high voltage of the turn-on level is applied to the second gate line Gate2, noise may be introduced into the sensing unit in the meantime.

In consideration of this, in another embodiment of the present disclosure, a blocking switch is provided between the sensing unit and the sensing line, and the connection between the photo sensor and the sensing unit is controlled. That is, it is possible to reduce noise introduced into the sensing unit through the sensing line while the photo sensor is connected to the sensing line.

FIG. 13 shows another circuit configuration of the present disclosure which inserts a blocking switch between the photo sensor and the sensing unit, and FIGS. 14 and 15 respectively show the timings of the control signals for the circuit configuration of FIG. 13.

By providing a blocking switch BLK between the sensing line and the sensing unit, it is possible to prevent noise from inputting through the sensing line even when a turn-on level period of the scan signal is long so a period in which the photo sensor and the sensing unit are connected to each other is prolonged.

In FIG. 14, around the time when a scan pulse is applied to the second gate line Gate2, that is around the time when the first sample/hold switch of the sensing unit is turned on, the blocking switch BLK is turned on to connect the sensing line and the sensing unit. As the scan pulse is applied to the second gate line Gate2, the photo sensor disposed on the second horizontal line is connected to the sensing line, and the charges of the photo sensor disposed on the second horizontal line move along the sensing line and are converted into an output voltage in the integrating circuit of the sensing unit.

After a predetermined time, for example one horizontal period has elapsed since the photo sensor disposed on the second horizontal line is connected to the sensing line, the blocking switch BLK is disconnected.

Thereafter, around the time when a scan pulse is applied to the eighth gate line Gate8, the blocking switch BLK is re-connected to connect the sensing line to the sensing unit. As the scan pulse is applied to the eighth gate line Gate8, the photo sensor disposed on the eighth horizontal line is connected to the sensing line, and the charges of the photo sensor disposed on the eighth horizontal line move along the sensing line and are further converted into an output voltage in the integrating circuit of the sensing unit.

After a predetermined time, for example one horizontal period has elapsed or the second sample/hold switch is turned on and then turned off since the photo sensor disposed on the eighth horizontal line is connected to the sensing line, the blocking switch BLK is disconnected. As shown in FIG. 14, the blocking switch BLK is turned on while each of the first sample/hold switch and the second sample/hold switch is turned on.

The blocking switch does not exert the effect of preventing noise from flowing only when the scan pulses are long so the scan pulses of neighboring gate lines overlap each other. Even when the scan pulses of neighboring gate lines do not overlap each other as shown in FIG. 15, the blocking switch may be applied to the case of summing the output signals of two photo sensors disposed on different horizontal lines by controlling the timings of the sample/hold switches in the sensing unit, thereby maintaining the connection state of the sensing line and the sensing unit for a long time so preventing noise from flowing through the sensing line.

FIG. 16 illustrates another embodiment of the present disclosure in which a plurality of photo sensors are disposed around one pixel, FIG. 17 illustrates the connection of a sensing gate line and a sensing line in the embodiment of FIG. 16, and FIG. 18 shows the timings of the control signals for the embodiment of FIG. 16.

When a plurality of photo sensors are arranged on the display panel, one photo sensor is arranged in a pixel unit group comprising a predetermined number of pixels in the horizontal direction and the vertical direction. In the embodiment of FIG. 16, a plurality of photo sensors may be disposed in the pixel unit group to raise the level of the output signal of the photo sensor, and a plurality of photo sensors may be disposed around one pixel to sense the outputs of the photo sensors at a same timing.

Since the incident light incident on the display panel from the laser pointer used as the light source for activating the photo sensors has a diameter enough to cover a plurality of pixels as shown in a circle in FIG. 16, the incident light may activate a plurality of photo sensors to raise the levels of the output signals of the photo sensors when a plurality of photo sensors are disposed around one pixel.

As a method for summing outputs of a plurality of photo sensors activated by one light source at a same timing, simply a plurality of photo sensors may be placed on a same horizontal line and around one pixel, and the plurality of photo sensors may be connected to a same gate line and a same sensing line.

In FIG. 17, nine photo sensors are arranged around one pixel (precisely a subpixel) arranged in the second horizontal line. The nine photo sensors disposed around one pixel are connected to a sensing gate that is separate from the gate lines connected to the pixels in the horizontal direction while the photo sensors disposed on a same horizontal line are connected to a same sensing gate line, and connected to one sensing line in the vertical direction.

However, in order to activate the nine photo sensors (in order to connect the photo sensors to the sensing line) in synchronization with the time when the scan pulse is applied to the pixel arranged at the center, three sensing gate lines Sensing Gate1, Sensing Gate2, and Sensing Gate3 may be connected to the second gate line Gate2 providing a scan pulse to the pixel disposed at the center (second horizontal line) as shown in FIG. 17.

Therefore, the photo sensors arranged in three horizontal lines adjacent to each other around the pixel disposed on the second horizontal line are connected to the sensing line when a scan pulse is applied to the second gate line Gate 2. And the sensing unit may be supplied with the charges stored in the photo sensors through the sensing line and integrate them in a summing manner, by controlling the reset switch RESET and the first and second sample/hold switches SH1 and SH2 in synchronization with the scan pulse applied to the second gate line Gate2.

As described above, by collectively detecting the charges stored in two or more photo sensors, it is possible to increase the level of the output signals of the photo sensors and make it less sensitive to external noise.

Throughout the description, it should be understood by those skilled in the art that various changes and modifications are possible without departing from the technical principles of the present disclosure. Therefore, the technical scope of the present disclosure is not limited to the detailed descriptions in this specification but should be defined by the scope of the appended claims.

What is claimed is:

1. A display device, comprising:
    a display panel including a plurality of pixels and a plurality of photo sensors, the plurality of pixels representing image data and the plurality of photo sensors each outputting an electric signal through a sensing line responsive to light incident on the photo sensor;
    a data driving circuit configured to provide data voltages corresponding to the image data to the plurality of pixels through a plurality of data lines;
    a gate driving circuit configured to supply, through a first gate line connected to a pixel from the plurality of pixels, a first scan signal that controls an application of a data voltage to the pixel that is disposed on a first horizontal line and controls a connection of a photo sensor from the plurality of photo sensors to the sensing line, the photo sensor disposed on the first horizontal line;
    a sensing driving circuit configured to output digital sensing data by summing electric signals of at least two photo sensors from the plurality of photo sensors, the two photo sensors including the first photo sensor and a second photo sensor that is disposed on a second horizontal line that is different from the first horizontal line, the first photo sensor and the second photo sensor sharing the sensing line; and
    a timing controller configured to provide the image data to the data driving circuit and to supply control signals for controlling the data driving circuit, the gate driving circuit and the sensing driving circuit.

2. The display device of claim 1, wherein the gate driving circuit is configured to supply a second scan signal to a second gate line that corresponds to the second horizontal line in which the second photo sensor is disposed, the second scan signal supplied in synchronization with when the first scan signal is supplied to the first gate line, the second horizontal line being disposed after the first horizontal line.

3. The display device of claim 1, wherein the sensing driving circuit comprises a sensing unit including:
    an integrating circuit that converts the electric signals into a plurality of voltages;
    a sample/hold switch that samples each of the plurality of voltages output by the integrating circuit, each of the plurality of voltages corresponding to one of the electrical signals;
    an analog-to-digital converter ADC that converts each of the sampled plurality of voltages into a corresponding digital representation,
    wherein the integrating circuit comprises an operational amplifier including an inverting terminal connected to the sensing line and a non-inverting terminal connected to a reference voltage, a feedback capacitor connecting together an output terminal of the integrating circuit and the inverting terminal of the operational amplifier, and a reset switch, and
    wherein the sample/hold switch comprises a first sample/hold switch and a second sample/hold switch connected in parallel.

4. The display device of claim 3, wherein the first sample/hold switch is turned on to sample the reference voltage of the integrating circuit and to output the sampled value of the reference voltage to the ADC prior to the first scan signal being supplied to the first gate line, and
    wherein the second sample/hold switch is turned on to sample an output voltage of the integrating circuit, the output voltage of the integrated circuit based on an integration of the electric signal supplied through the sensing line and to output the sampled value to the ADC after the first scan signal is supplied.

5. The display device of claim 4, wherein the ADC converts a difference between the sampled value of the reference voltage and the sampled value of the output voltage into the digital sensing data, and provides the digital sensing data to the timing controller.

6. The display device of claim 3, wherein the first sample/hold switch is turned on to sample the reference voltage of the integrating circuit as a first value and to output the first value to the ADC prior to the first scan signal being supplied to the first gate line, and
    wherein the second sample/hold switch is turned on to sample, as a second value, an output voltage of the integrating circuit, the output voltage of the integrated circuit based on an integration of the electric signal supplied through the sensing line and to output the second value to the ADC after a predetermined time has elapsed from when a second scan signal is supplied to a second gate line corresponding to the second horizontal line that is disposed after the first horizontal line, the second signal supplied after the first scan signal is supplied.

7. The display device of claim 6, further comprising:
a blocking switch connected between the sensing line and the sensing unit, the blocking switch configured to control a connection between the sensing line and the sensing unit,
wherein the blocking switch disconnects the sensing line and the sensing unit after the predetermined time has elapsed.

8. The display device of claim 1, wherein a portion of the plurality of photo sensors are disposed on a same horizontal line and are connected to the sensing line.

9. The display device of claim 1, wherein the plurality of photo sensors are disposed on adjacent horizontal lines and share the sensing line, the plurality of photo sensors connected to the sensing line in response to the scan signal for a same gate line.

10. The display device of claim 1, wherein the first photo sensor comprises a photo thin-film transistor (TFT) that outputs a current corresponding to incident light, a photo capacitor that charges the current output from the photo TFT, and a switching TFT that controls a connection of the photo capacitor and the sensing line in response to the first scan signal.

11. The display device of claim 1, wherein the data driving circuit and the sensing driving circuit are implemented as a single integrated circuit.

12. The display device of claim 1, wherein the timing controller is configured to compare the digital sensing data from the sensing driving circuit with a reference value, generate a coordinate of the photo sensor outputting the digital sensing data exceeding the reference value, and transmit the coordinate to a connected host system.

13. The display device of claim 1, wherein one photo sensor is arranged for each pixel unit group composed of a plurality of the pixels.

14. A display device comprising:
a display panel including a plurality of pixels including a first pixel and a second pixel, and a plurality of photo sensors including a first photo sensor and a second photo sensor that each output an electric signal responsive to incident light, wherein the first pixel and the first photo sensor are disposed in a first horizontal line of the display panel and the second pixel and the second photo sensor are disposed in a second horizontal line of the display panel that is different from the first horizontal line;
a data driving circuit configured to provide data voltages to the plurality of pixels through a plurality of data lines connected to the plurality of pixels;
a gate driving circuit configured to supply a plurality of scan signals to the plurality of pixels and the plurality of photo sensors, the plurality of scan signals including a first scan signal and a second scan signal, wherein the first scan signal is supplied to the first pixel and the first photo sensor through a first gate line to apply a data voltage to the first pixel via a data line connected to the first pixel and to connect the first photo sensor to a sensing line, and the second scan signal is supplied to the second pixel and the second photo sensor through a second gate line to connect the second photo sensor to the sensing line without applying a data voltage to the second pixel, the second scan signal supplied to the second gate line while the first scan signal is supplied to the first gate line; and
a sensing driving circuit to output digital sensing data based on the electric signals output by the first photo sensor and the second photo sensor via the sensing line responsive to the incident light.

15. The display device of claim 14, wherein the sensing driving circuit outputs the digital sensing data based on a summation of the electric signals output by the first photo sensor and the second photo sensor.

16. The display device of claim 14, wherein the sensing driving circuit comprises a sensing unit including:
an integrating circuit that converts the electric signals into a plurality of voltages, the integrating circuit including an operational amplifier comprising an inverting terminal connected to the sensing line and a non-inverting terminal connected to a reference voltage, and a feedback capacitor and a reset switch that are both connected to an output terminal of the integrating circuit and the inverting terminal of the operational amplifier;
a sample/hold switch connected to the integrating circuit and including a first sample/hold switch and a second sample/hold switch that are connected in parallel, the sample/hold switch sampling each of the plurality of voltages output by the integrating circuit, each of the plurality of voltages corresponding to one of the electric signals; and
an analog-to-digital converter (ADC) connected to the sample/hold switch, the ADC converting each of the sampled plurality of voltages into a corresponding digital representation.

17. The display device of claim 16, wherein the first sample/hold switch is turned on to sample the reference voltage of the integrating circuit and to output the sampled value of the reference voltage to the ADC prior to the first scan signal being supplied to the first gate line, and
wherein the second sample/hold switch is turned on to sample an output voltage of the integrating circuit after the first scan signal is supplied, the output voltage of the integrated circuit based on an integration of the electric signal supplied through the sensing line and to output the sampled value to the ADC.

18. The display device of claim 17, wherein the ADC converts a difference between the sampled value of the reference voltage and the sampled value of the output voltage into the digital sensing data, and provides the digital sensing data to a timing controller.

19. The display device of claim 16, wherein the first sample/hold switch is turned on to sample the reference voltage of the integrating circuit as a first value and to output the first value to the ADC prior to the first scan signal being supplied to the first gate line, and
wherein the second sample/hold switch is turned on to sample, as a second value, an output voltage of the integrating circuit after a predetermined time has elapsed from when a second scan signal is supplied to the second gate line, the output voltage of the integrated circuit based on an integration of the electric signal supplied through the sensing line and to output the second value to the ADC.

20. The display device of claim 19, further comprising:
a blocking switch connected between the sensing line and the sensing unit, the blocking switch disconnecting the sensing line from the sensing unit while at least one of the first sample/hold switch or the second sample/hold switch is turned on.

21. The display device of claim 14, wherein a portion of the plurality of photo sensors are disposed on a same horizontal line, the portion of the plurality of photo sensors connected to the sensing line.

22. The display device of claim 14, wherein the plurality of photo sensors that are disposed on adjacent horizontal lines and share the sensing line.

* * * * *